US011926547B2

(12) United States Patent
Babanova et al.

(10) Patent No.: US 11,926,547 B2
(45) Date of Patent: *Mar. 12, 2024

(54) SCALABLE FLOATING MICRO-AERATION UNIT, DEVICES AND METHODS

(71) Applicant: AQUACYCL, INC., Escondido, CA (US)

(72) Inventors: Sofia Malinova Babanova, San Diego, CA (US); Orianna Bretschger, San Diego, CA (US); Jaime Octavio García Cornejo, La Mesa, CA (US); Jason Daniel Jones, Cardiff By The Sea, CA (US)

(73) Assignee: AQUACYCL, INC., Escondido, CA (US)

( * ) Notice: Subject to any disclaimer, the term of this patent is extended or adjusted under 35 U.S.C. 154(b) by 180 days.

This patent is subject to a terminal disclaimer.

(21) Appl. No.: 17/464,478

(22) Filed: Sep. 1, 2021

(65) Prior Publication Data
US 2022/0098069 A1 Mar. 31, 2022

Related U.S. Application Data

(63) Continuation of application No. 16/803,119, filed on Feb. 27, 2020, now Pat. No. 11,186,503.
(Continued)

(51) Int. Cl.
*C02F 3/08* (2023.01)
*C02F 3/00* (2023.01)
(Continued)

(52) U.S. Cl.
CPC ............... *C02F 3/08* (2013.01); *C02F 3/005* (2013.01); *C02F 3/006* (2013.01); *C02F 3/10* (2013.01);
(Continued)

(58) Field of Classification Search
CPC ........ C02F 2101/101; C02F 3/14; C02F 3/02; C02F 3/103; C02F 3/005; C02F 3/006; C02F 3/345; C02F 7/00
(Continued)

(56) References Cited

U.S. PATENT DOCUMENTS 3,235,234 A 2/1966 Beaudoin
3,879,285 A 4/1975 Yost
(Continued)

FOREIGN PATENT DOCUMENTS

CN 101315985 A 12/2008
CN 101702440 A 5/2010
(Continued)

OTHER PUBLICATIONS

European Application No. 19826324.6 Supplemental European Search Report dated Feb. 2, 2022, pp. 1-12.
(Continued)

*Primary Examiner* — Claire A Norris
(74) *Attorney, Agent, or Firm* — Perkins Coie LLP

(57) ABSTRACT

Disclosed are floating micro-aeration unit (FMU) devices, systems and methods for biological sulfide removal from water/wastewater bodies and streams. In some aspects, a system includes a manifold structure including one or more opening to flow air out of an interior of the manifold structure; one or more support structures connected to the manifold structure, in which the one or more support structures are floatable on a surface of a fluid that includes water or a wastewater; and an air source that flows air to the manifold structure, such that the manifold structure supplies the air containing a predetermined amount of oxygen (e.g., less than 0.1 mg/L of oxygen) to oxidize sulfide of the fluid.

19 Claims, 14 Drawing Sheets

Related U.S. Application Data

(60) Provisional application No. 62/811,496, filed on Feb. 27, 2019.

(51) Int. Cl.
| | | |
|---|---|---|
| *C02F 3/10* | (2023.01) | |
| *C02F 3/34* | (2023.01) | |
| *H01M 8/16* | (2006.01) | |
| *C02F 101/10* | (2006.01) | |

(52) U.S. Cl.
CPC .............. *C02F 3/103* (2013.01); *C02F 3/345* (2013.01); *H01M 8/16* (2013.01); *C02F 2101/101* (2013.01); *C02F 2209/22* (2013.01); *C02F 2209/38* (2013.01)

(58) Field of Classification Search
USPC .............................. 210/620, 242.2, 614, 615
See application file for complete search history.

(56) References Cited

U.S. PATENT DOCUMENTS

| | | |
|---|---|---|
| D236,463 S | 8/1975 | Giovagnoli et al. |
| D276,604 S | 12/1984 | King |
| 4,978,429 A | 12/1990 | Sears |
| D357,056 S | 4/1995 | Linton |
| 5,449,460 A | 9/1995 | Buisman |
| 5,736,049 A | 4/1998 | Bundy |
| 7,922,907 B2 | 4/2011 | Hassan et al. |
| D642,118 S | 7/2011 | Uneo |
| D646,636 S | 10/2011 | Riimala |
| 8,366,932 B1 | 2/2013 | Sung |
| 8,415,037 B2 | 4/2013 | Nealson et al. |
| 8,460,509 B2 | 6/2013 | Lakatos |
| 8,524,402 B2 | 9/2013 | He et al. |
| 8,597,513 B2 | 12/2013 | Borole et al. |
| D729,736 S | 5/2015 | Matthews |
| 9,321,666 B1 | 4/2016 | Reilly |
| D758,527 S | 6/2016 | Quiblier |
| D771,769 S | 11/2016 | Pin |
| 9,505,636 B2 | 11/2016 | Bretschger |
| 9,828,272 B2 | 11/2017 | Krieger |
| D862,378 S | 10/2019 | Leitner |
| D864,111 S | 10/2019 | Gleave |
| D864,622 S | 10/2019 | Lim |
| 10,479,699 B1 | 11/2019 | Chandler, Jr. et al. |
| D870,058 S | 12/2019 | Archer |
| D870,686 S | 12/2019 | Archer |
| D875,207 S | 2/2020 | Babanova et al. |
| D875,208 S | 2/2020 | Babanova et al. |
| 10,570,039 B2 | 2/2020 | Bretschger et al. |
| D899,561 S | 10/2020 | Babanova et al. |
| D902,842 S | 11/2020 | Babanova et al. |
| 2003/0190742 A1 | 10/2003 | Whiteman |
| 2004/0045899 A1 | 3/2004 | Humphrey |
| 2004/0060857 A1 | 4/2004 | Pattee |
| 2004/0188334 A1 | 9/2004 | McWhirter |
| 2005/0244957 A1 | 11/2005 | Stock |
| 2005/0269262 A1 | 12/2005 | McBride |
| 2006/0096917 A1* | 5/2006 | Rose ........................ C02F 3/006 210/614 |
| 2007/0200262 A1 | 8/2007 | Hills |
| 2008/0292912 A1 | 11/2008 | Logan et al. |
| 2009/0218299 A1 | 9/2009 | Cote |
| 2009/0226772 A1 | 9/2009 | Stark et al. |
| 2010/0003543 A1 | 1/2010 | Zhou |
| 2011/0042309 A1* | 2/2011 | Keeton ............ B01F 35/32005 210/88 |
| 2011/0132822 A1 | 6/2011 | Kaw |
| 2011/0140457 A1 | 6/2011 | Lakatos |
| 2012/0055859 A1 | 3/2012 | Reilly |
| 2012/0093692 A1 | 4/2012 | Blomberg |
| 2012/0152835 A1 | 6/2012 | Cardenas et al. |
| 2013/0266876 A1 | 10/2013 | Shechter |
| 2013/0302703 A1 | 11/2013 | Bretschger et al. |
| 2014/0021137 A1 | 1/2014 | Smiddy |
| 2014/0110323 A1 | 4/2014 | Al-Anzi |
| 2014/0141286 A1 | 5/2014 | Bretschger et al. |
| 2014/0266001 A1 | 9/2014 | Wilde |
| 2015/0014246 A1 | 1/2015 | McFadden |
| 2015/0251934 A1 | 9/2015 | Bretschger |
| 2015/0349350 A1 | 12/2015 | Liu et al. |
| 2016/0083952 A1 | 3/2016 | Lee |
| 2016/0115062 A1 | 4/2016 | Krieger |
| 2017/0275193 A1 | 9/2017 | Graves |
| 2017/0342698 A1 | 11/2017 | Fink |
| 2018/0097237 A1 | 4/2018 | Chadwick |
| 2019/0301029 A1 | 10/2019 | May |
| 2020/0002200 A1 | 1/2020 | Bretschger et al. |
| 2020/0036029 A1 | 1/2020 | Babanova et al. |
| 2020/0270152 A1 | 8/2020 | Bretschger et al. |
| 2020/0270153 A1 | 8/2020 | Babanova et al. |

FOREIGN PATENT DOCUMENTS

| | | | |
|---|---|---|---|
| CN | 103098283 A | | 5/2013 |
| CN | 103262323 A | | 8/2013 |
| CN | 204265518 U | | 4/2015 |
| CN | 105470546 A | | 4/2016 |
| CN | 107324499 A | | 11/2017 |
| CN | 107324499 A | * | 11/2017 |
| CN | 107720938 A | | 2/2018 |
| FR | 2956657 A1 | | 8/2011 |
| JP | 2014008461 A | | 1/2014 |
| KR | 200314231 Y1 | | 5/2003 |
| KR | 2005-0063147 A | | 6/2005 |
| WO | 2007131022 A2 | | 11/2007 |
| WO | 2011088348 A1 | | 1/2011 |
| WO | 2012081001 A1 | | 6/2012 |
| WO | 2013071401 A1 | | 5/2013 |
| WO | 2014144705 A2 | | 9/2014 |
| WO | 2016061665 A1 | | 4/2016 |
| WO | WO-2016061665 A1 * | 4/2016 | .............. C02F 3/006 |

OTHER PUBLICATIONS

Vikramaditya, Singh Kunwar et al. "Approaches in microbial fuel cell array arrangements for conventional DC battery charger," 2018 2nd International Conference on Inventive Systems and Control (ICISC), IEEE, Jan. 19, 2018, pp. 418-422.

Chinese Patent Office, First Office Action for CN 201980055562.7, dated Jul. 20, 2022, 34 pages with English translation.

Singapore Patent Office, Search Report & Written Opinion for SG 11202109330V, dated Jul. 22 and Jul. 25, 2022, 9 pages.

Aquam Technologies_SBIO'18, posted at youtube.com, posted Apr. 19, 2018, online, URL:https://www.youtube.com/watch?v=Sp795_Erp4c (Year: 2018).

Babanova, Sofia et al. "New Pretreatment Approaches to increase efficiency of anaerobic digesters", no date. Aquacycl LLC., pp. 1-13.

Babanova, Sofia. "New perspectives in sugar industry wastewater treatment," International Sugar Journal, Aug. 2020, pp. 62-65 (2pages).

Biffinger, Justin C., et al., "Engineering Microbial Fuels Cells: Recent Patents and New Directions", US Naval Research Laboratory, Paper 22—http://digitalcommons.unl.edu/usnavyresearch/22 (2008) (7 pages).

Chung, Kyungmi, et al., "Continuous Power Generation and Microbial Community Structure of the Anode Biofilms in a Three-Stage Microbial Fuel Cell System", Appl Microbial Biotechnol (2009) 83:965-977.

Egbadon, Emmanuel, et al., "Simultaneous Generation of Bioelectricity and Treatment of Swine Wastewater in a Microbial Fuel Cell", International Letters of Natural Sciences—SSN: 2300-9675, vol. 54, pp. 100-107.

Eppinger, Mark, et al., "Comparative Analysis of Four Campylobacterales", Nature Reviews—Microbiology—vol. 2, Nov. 2004, pp. 1-16.

(56) References Cited

OTHER PUBLICATIONS

Ginige, Maneesha P., et al., "Investigation of an Acetate-Fed Denitrifying Microbial Community by Stable Isotope Probing, Full-Cycle rRNA Analysis, and Fluorescent In Situ Hybridization-Microautoradiography", Applied and Environmental Microbiology, vol. 71, No. 12—Dec. 2005, p. 8683-8691.
He, Weihua, et al., "The Effect of Faw Modes and Electrode Combinations on the Performance of a Multiple Module Microbial Fuel Cell Installed at Wastewater Treatment Plant", Water Research 105 (2016) 351-360.
Hutchinson, Adam J., et al., "Analysis of Carbon Fiber Brush Loading in Anodes on Startup and Performance of Microbial Fuel Cells", Journal of Power Sources 196 (2011) 9213-9219.
Ichihashi, 0., et al., "Removal and Recovery of Phosphorus as Struvite From Swine Wastewater Using Microbial Fuel Cell", Bioresource Technology 114 (2012) 303-307.
International Search Report and Written Opinion dated Sep. 30, 2019 of PCT/US2019/039899 (14 pages).
International Search Report and Written Opinion dated Jun. 10, 2020 of PCT/US2020/020177 (9 pages).
Ishii, Shun'ichi, et al., "A Novel Metatranscriptomic Approach to Identify Gene Expression Dynamics During Extracellular Electron Transfer", Nature Communications, 14:1601 I Doi: 10.1038/ncomms2615 I www.nature.com/naturecommunications—Received Nov. 26, 2012 I Accepted Feb. 19, 2013 I Published Mar. 19, 2013—pp. 1-10.
Ishii, Shun'ichi, et al., "Identifying the Microbial Communities and Operational Conditions for Optimized Wastewater Treatment in Microbial Fuel Cells", Water Research 47 (2013) 7120-7130.
Jimenez, Jose I., et al., "Genomic Insights in the Metabolism of Aromatic Compounds in Pseudomonas", Pseudomonas, vol. 3—Kluwer Academic/ Plenum Publishers, New York, 2004—pp. 425-462.
Kelly, Patrick T., et al., "Nutrients Removal and Recovery in Bioelectrochemical Systems: A review", Bioresource Technology 153 (2014) 351-360.
Kim, Jung R., et al., "Analysis of Ammonia Loss Mechanisms in Microbial Fuel Cells Treating Animal Wastewater", Biotechnology and Bioengineering, vol. 99, No. 5, Apr. 1, 2008—pp. 1120-1127.
Kim, Jung R., et al., "Removal of Odors from Swine Wastewater by Using Microbial Fuel Cells", Applied and Environmental Microbiology, Apr. 2008, p. 2540-2543—vol. 74, No. 8.
Kim, Kyoung-Yeol, et al., "Continuous Treatment of High Strength Wastewaters Using Air-Cathode Microbial Fuel Cells", Bioresource Technology 221 (2016) 96-101.
Lebrecht et al. Treating Sulfur in Wastewater. Feb. 2015 [Retrieved May 3, 2020) Retrieved from Internet URL: < http://www.airproducts.com/-/media/downloads/w/wastewater-treatmen Vdata-sheets/en-treating-sulfur-in-wastewater.pdf >. pp. 1-5.
Lim, Seung J., et al., "Swine Wastewater Treatment Using a Unique Sequence of Ion Exchange Membranes and Bioelectrochemical System", Bioresource Technology 118 (2012) 163-169.
Lu, Mengqian, et al., "Long-term Performance of a 20-L Continuous Faw Microbial Fuel Cell for Treatment of Brewery Wastewater", Journal of Power Sources xxx (2017) 1-14.
Mann, Ethane., et al., "Pseudomonas Biofilm Matrix Composition and Niche Biology", FEMS Microbial Rev 36 (2012) 893-916.
Matlock, Marty, et al., "A Life Cycle Analysis of Water Use in U.S. Pork Production", University of Arkansas I Division of Agriculture I 78 pages (2011).

Mcilroy, Simon J., et al., "Identification of Active Denitrifiers in Full-scale Nutrient Removal Wastewater Treatment Systems", Environmental Microbiology (2016) 18(1), 50-64.
Min, Booki, et al., "Electricity Generation From Swine Wastewater Using Microbial Fuel Cells", Water Research 39 (2005) 4961-4968.
Molognoni, Daniele, et al., "Multiparametric Control for Enhanced Biofilm Selection in Microbial Fuel Cells", J Chem Technol Biotechnol 2016; 91: 1720-1727.
Sander, Elisa M., et al., "Dissimilatory Nitrate Reduction to Ammonium as an Electron Sink During Cathodic Denitrification", RSC Adv.,2015, 5, 86572-86577.
Tharali, Akshay D. et al., "Microbial Fuel Cells in Bioelectricity Production", Frontiers in Life Science, 2016—vol. 9, No. 4, 252-266SSN: 2155-3769 (Print) 2155-3777 (Online) Journal homepage: http://www.tandfonline.com/loi/tfls20.
Van Den Berg, Eveline M., et al., "DNRA and Denitri!cation Coexist over a Broad Range of Acetate/N-NO3-Ratios, in a Chemostat Enrichment Culture", Frontiers in Microbiology I www.frontiersin.org—Nov. 2016 I vol. 7 I Article 1842—13 pages.
Van Lier, Jules B., et al., "Anaerobic Wastewater Treatment", Biological Wastewater Treatment: Principles Modeling and Design—2008—ISBN: 9781843391883.
Vilajeliu-Pons, Anna, et al., "Microbiome Characterization of MFCs Used for the Treatment of Swine Manure", Journal of Hazardous Materials 288 (2015) 60-68.
Virdis, Bernardino, et al., "Microbial Fuel Cells for Simultaneous Carbon and Nitrogen Removal", Water Research 42 (2008) 3013-3024.
Wallace, Mark. Tackling the water crisis will be just as hard as it sounds: As entrepreneurs grapple with water sustainability, they find big challenges lie beneath the surface. Mar. 22, 2019 (Retrieved on Feb. 11, 2020, retrieved from the internet URL: www.fastcompany.com/90323352/tackling-the-water-crisis-will-be-just-as-hard-as-it-shounds. pp. 1-13.
Winfield, Jonathan, et al., "Investigating the Effects of Fuidic Connection Between Microbial Fuel Cells", Bioprocess Biosyst Eng (2011) 34:477-484.
Zhuang, Li, et al., "Scalable microbial Fuel Cell (MFC) Stack for Continuous Real Wastewater Treatment", Bioresource Technology 106 (2012) 82-88.
Zhuang, Li, et al., "Substrate Cross-Conduction Effect on the Performance of Serially Connected Microbial Fuel Cell Stack", Electrochemistry Communications 11 (2009) 937-940.
Indian Application No. 202117003695, First Examination Report dated Oct. 2, 2022, pp. 1-6.
European Application No. 20762154.1-1101, Extended European Search Report dated Nov. 15, 2022, pp. 1-12.
European Application No. 20762154.1-1101, Office Action dated Dec. 15, 2022, pp. 1.
Krayzelova, Lucie et al. "Microaeration for hydrogen sulfide removal during anaerobic treatment: a review." Rev. Environ. Sci Biotechnol. vol. 14, pp. 703-725, Nov. 14, 2015.
Chinese Patent Office, 2nd Office Action for Appl. No. 201980055562.7, dated Mar. 22, 2023, 21 pages of English Translation.
U.S. Patent & Trademark Office, Non-Final Office Action for U.S. Appl. No. 17/464,478, dated Jun. 6, 2023, 23 pages.
U.S. Patent & Trademark Office, Non-Final Office Action for U.S. Appl. No. 18/181,526, dated Jul. 13, 2023, 13 pages.
Chinese Patent Office, 3rd Office Action for Appl. No. 201980055562.7, dated Jul. 15, 2023, 21 pages of English Translation.
Israel Application No. 279787 Office Action dated Jun. 22, 2023, pp. 1-7.

\* cited by examiner

SCALABLE FLOATING MICRO-AERATION UNIT, DEVICES AND METHODS

CROSS-REFERENCE TO RELATED APPLICATIONS

This patent document is a continuation of U.S. application Ser. No. 16/803,119 entitled "SCALABLE FLOATING MICRO-AERATION UNIT, DEVICES AND METHODS" filed Feb. 27, 2020, and which claims priority to and the benefits of U.S. Provisional Patent Application No. 62/811,496 entitled "SCALABLE FLOATING MICRO-AERATION UNIT, DEVICES AND METHODS" filed on Feb. 27, 2019. The entire content of the aforementioned patent application is incorporated by reference as part of the disclosure of this patent document.

TECHNICAL FIELD

This patent document relates to water and wastewater technology.

BACKGROUND

For safety and environmental protection, severe limits upon permissible emission of sulfur and its compounds into the atmosphere, especially hydrogen sulfide, have been set by law in many industrialized nations. As such, there is increasing interest in the development of effective and low-cost methods for removing sulfur from contaminated water which minimize the discharge and release of the sulfur and its compounds.

SUMMARY

Disclosed are scalable micro-aeration devices, systems and methods for sulfide removal in water and wastewater bodies and streams.

In some aspects, a system for sulfide removal from water or wastewater includes a manifold structure including one or more openings to flow air out of an interior of the manifold structure; one or more support structures connected to the manifold structure, wherein the one or more support structures are floatable on a surface of a fluid including water or wastewater; and an air source configured to supply air to the manifold structure to be flowed out from the manifold structure through the one or more openings at the fluid to facilitate sulfide in the fluid to oxidize, wherein the air flowed out of the interior manifold structure includes an amount of oxygen gas comprising less than 0.1 mg/L of oxygen ($O_2$).

In some aspects, a method of removing sulfide from a fluid containing water or wastewater includes contacting a fluid containing water or wastewater with a manifold structure that includes one or more openings to flow air out of an interior of the manifold structure, wherein the manifold structure is configured to float on a surface of the fluid based on one or more support structures connected to the manifold structure; flowing air out of the interior of the manifold structure to supply an amount of oxygen gas comprising less than 0.1 mg/L of oxygen ($O_2$) to the fluid; and converting the sulfide to from the fluid to elemental sulfur.

The subject matter described in this patent document can be implemented in specific ways that provide one or more of the following features.

DETAILED DESCRIPTION

Figure 1A:
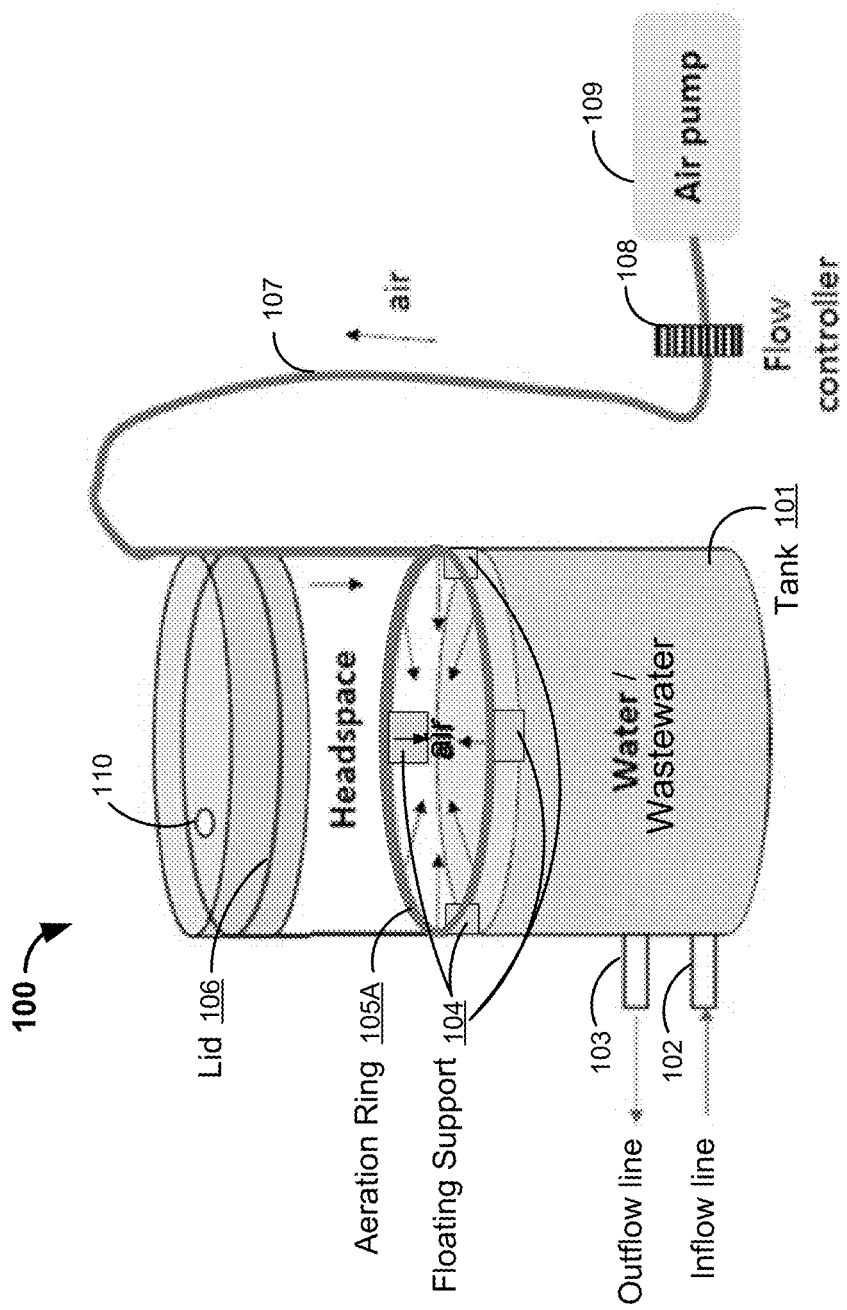
FIGS. 1A and 1B show diagrams of example embodiments of a floating micro-aeration unit (FMU) in accordance with the present technology for sulfide removal from water and/or wastewater bodies and streams.

High sulfide concentrations are a major problem in water and wastewater treatment, and odor management. Sulfate and sulfide rich water and wastewater could cause fast metal and concrete corrosion, emissions of unpleasant odors, and is toxic to humans. The presence of sulfide in wastewater causes corrosion of water transport systems and the accumulation of metal sulfides in the biological sludge. Moreover, sulfide is toxic to methanogens and, in most cases, causes inhibition of anaerobic water treatment processes. Therefore, the presence of sulfide dissolved in water/wastewater becomes a significant problem in anaerobic digestion as a wastewater treatment process.

Under anaerobic conditions, sulfate-reducing bacteria use sulfate as a final electron acceptor for the degradation of organic matter present in the water. Thus, the sulfate is reduced to hydrogen sulfide and is then distributed in both the liquid and gas phase (e.g., as a biogas). Sulfate reduction is unwanted and can be a parasitic reaction in wastewater treatment, which leads to the production and accumulation of hydrogen sulfide.

One way to treat sulfide in water is using micro-aeration. A micro-aeration unit is a device that supplies small amounts of air on the water surface that is used by sulfur-oxidizing bacteria to convert sulfide dissolved in the water into elemental sulfur and thus remove sulfide from the water body. Typically, micro-aeration allows the supply of small ("micro") amounts of oxygen (e.g., <0.1 mg/L $O_2$) to the gas phase, as in the following example reaction.

$$2HS^- + O_2 \rightarrow 2S^\circ + 2OH^- \text{ (under micro-oxygen conditions)} \tag{Eq. 1}$$

Under microaerobic conditions, sulfide-oxidizing bacteria present convert the sulfide to elemental sulfur, which is removed from the gas phase and is no longer an impurity in the biogas.

Under higher oxygen concentrations (e.g., >0.1 mg/L $O_2$) sulfide is oxidized back to sulfate or thiosulfate. Therefore, the oxygen concentration is critical for sulfide removal and higher oxygen concentrations are undesirable.

$$2HS^- + 2O_2 \rightarrow S_2O_3^{2-} + 2H_2O \text{ (under higher oxygen amounts)} \quad (Eq.\ 2)$$

$$2HS^- + 4O_2 \rightarrow 2SO_4^{2-} + 2H^+ \text{ (under excess of oxygen)} \quad (Eq.\ 3)$$

Conventional micro-aeration devices have been developed and employed for sulfide removal in a gas phase, but have not been designed or explored for sulfide removal in water and wastewater bodies. For example, conventional micro-aeration units are used for the post-treatment of anaerobically-digested methane that is generated by an anaerobic digestive system, as opposed to preventing sulfide introduction in the gas phase in the first place. In addition, conventional micro-aeration devices have a fixed structure, which restricts the water quantity of water that can be purified to a desired range or level of purification. Furthermore, because the design of conventional micro-aeration devices has been focused on the removal of sulfide in a gas phase (e.g., post-treatment), they do not provide a uniform micro-air distribution. Moreover, conventional micro-aeration devices tend to be small devices through which the methane or the gas needing purification passes through, and as such, the small size of these devices limits their applicability on a larger scale. As such, there is a need for a new approach that can overcome these and other shortcomings by existing micro-aeration techniques.

Disclosed are scalable micro-aeration devices, systems and methods that include a floating micro-aeration unit (FMU) for sulfide removal from water and wastewater bodies or streams. In various implementations, for example, the floating-features of the disclosed micro-aeration techniques and devices permit and control air supply only at the water surface without aerating the main water body and thus disturbing the anaerobic treatment processes. Some implementations of the disclosed FMU devices, systems and method, described herein, use sulfur oxidizing bacteria, which in the presence of micro-oxygen concentrations, are able to convert sulfide dissolved in water into elemental sulfur.

In some implementations, the FMU in accordance with the present technology is designed to provide micro-aerobic conditions at a water-gas interface. By creating the micro-aerobic conditions at the water-gas interface, the device can aerate the top layer of the water surface thereby, allowing for the remainder (e.g., majority) of the water body to remain under anaerobic conditions. This is important for anaerobic wastewater treatment technologies such as anaerobic digestion and MFCs. For example, aerating the entire water body will introduce significant changes in the microbial population in the reactors and switch the treatment process from anaerobic into aerobic process. This arises, for example, because higher oxygen concentration in an anaerobic digestor will cause a toxic effect on methanogenesis and methane generation.

In some applications, for example, the FMU devices, systems and methods can be used for the removal of sulfide from methane, as hydrogen sulfide can corrode materials like those cogeneration systems for methane conversion in electrical energy.

In some implementations, example embodiments of the FMU in accordance with the present technology are designed for the removal of hydrogen sulfide from the liquid phase. Since the majority of sulfide removal appears at the gas-liquid interface, for example, the FMU supplies small oxygen concentrations at the gas-liquid interphase, where sulfide-oxidizing bacteria are intentionally grown. The micro-aeration device is free floating as opposed to being permanently fixed, allowing for the efficient treatment of variable water and/or wastewater volumes. The floating micro-aeration process can be implemented directly into the existing water body or explored as a separate flow through unit.

Implementations of the disclosed embodiments of a FMU can include one or more of the following features and advantages. For instance, various embodiments of the disclosed FMU devices have a scalable design and architecture that allows an FMU device to be sized based on the specifics of wastewater treatment facilities. For example, the FMU can be designed as a separate unit through which the water and/or wastewater flows, or the FMU can be incorporated in the existing water and/or wastewater treatment units, such as holding or equilibrium tanks. The size of the FMU depends on the volume and flow rate of the water and/or wastewater. The stand-alone FMU is 'plug-and-play' and does not require any infrastructure changes. The same applies to FMUs imbedded in an already existing tank, for example.

Also, for instance, the disclosed FMU systems, methods and devices can be employed for any wastewater treatment on various scales. While some of the example implementations described herein are primarily based on treating brewery wastewater using certain example embodiments of the FMU systems and methods to facilitate understanding of the underlying concepts, e.g., brewery wastewater, it is understood that the disclosed embodiments can also include treatment of other wastewater in addition to brewery sources.

Brewery wastewater is characterized with high protein and sulfate content. Thus, during its degradation, brewery wastewater releases significant amount of sulfide. The low Chemical Oxygen Demand (COD) to sulfide ratio (COD/S) ratio in brewery wastewater of 3/50 also leads to the production of larger amounts of hydrogen sulfide.

An example of brewery wastewater chemical composition is included in Table 1.

TABLE 1

| Parameter | Concentration |
| --- | --- |
| Total Chemical Oxygen Demand (COD (T)) | 2960 mg/L |
| Soluble Chemical Oxygen Demand (COD(S)) | 2320 mg/L |
| Volatile Fatty Acids | 556 mg/L |
| Protein | 161 mg/L |
| pH | 7.57 |
| Conductivity | 5.78 mS/cm |
| Sulfide | 0.13 mg/L |
| Sulfate | 110 mg/L |
| Nitrate | 26 mg/L |
| Nitrite | 0 mg/L |
| Phosphate | 610 mg/L |
| Total Suspended Solids | 1933 mg/L |
| Total Inorganic Nitrogen | 38 mg/L |

Figure 1B:
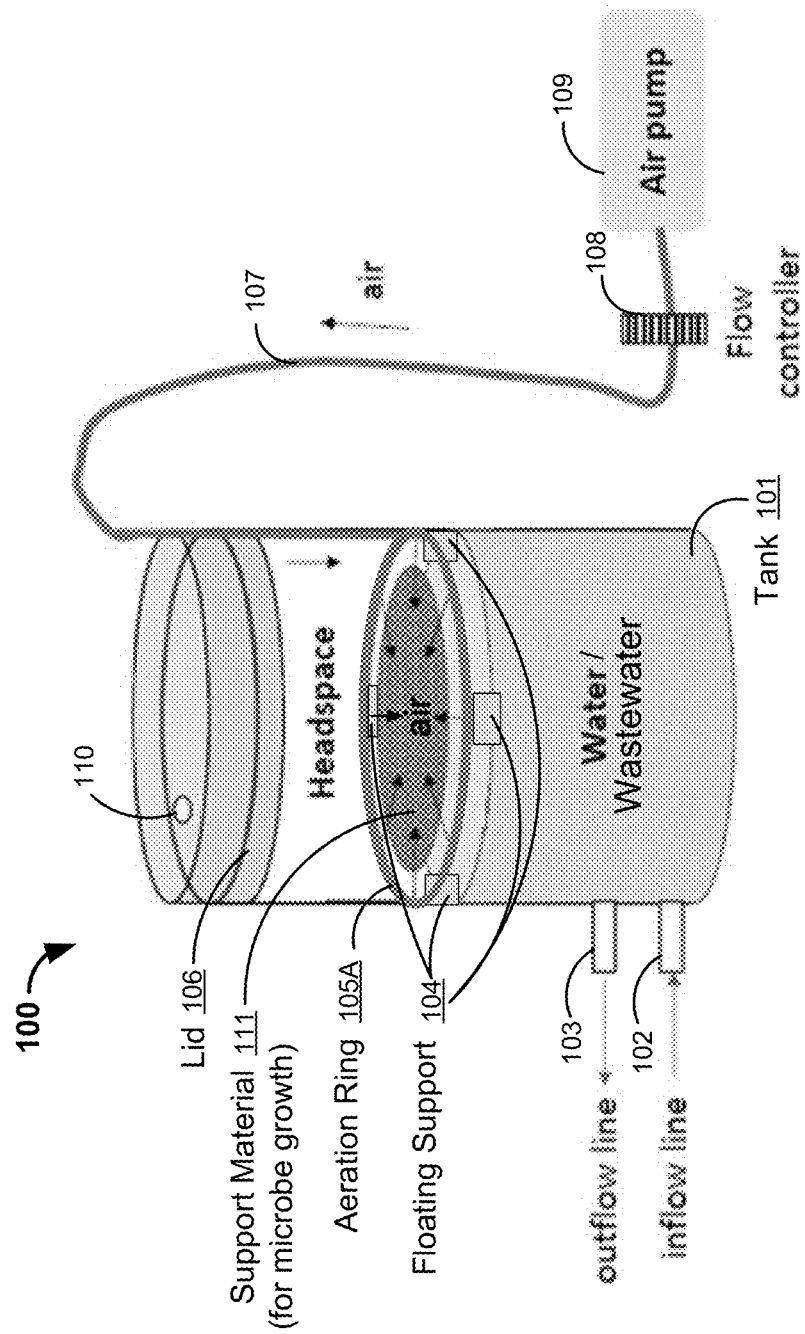
Figure 1C:
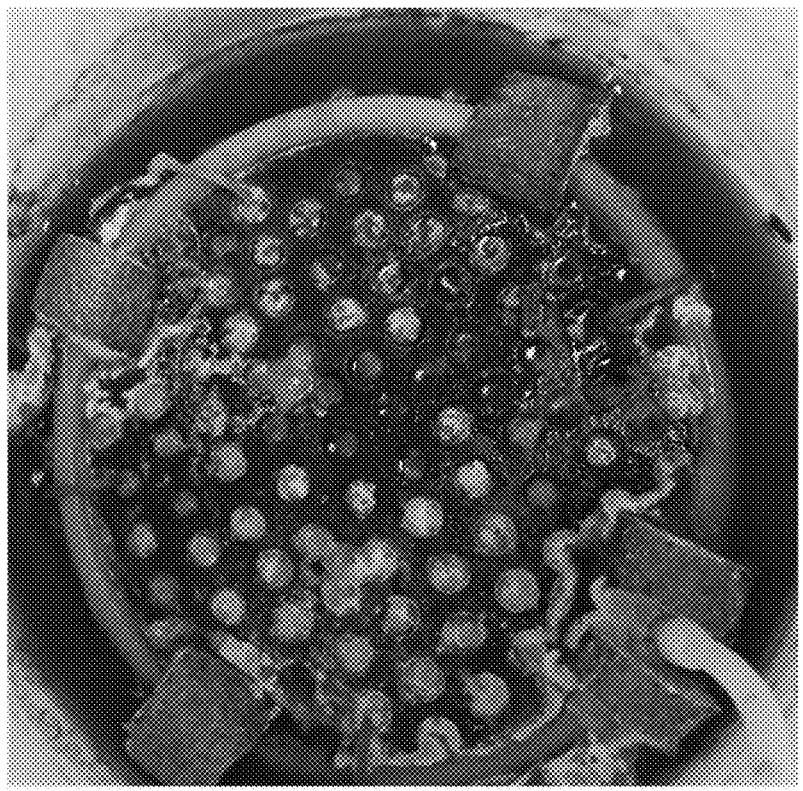
FIG. 1C shows images of biofilm growth on an example implementation of an FMU device.
Figure 1C:
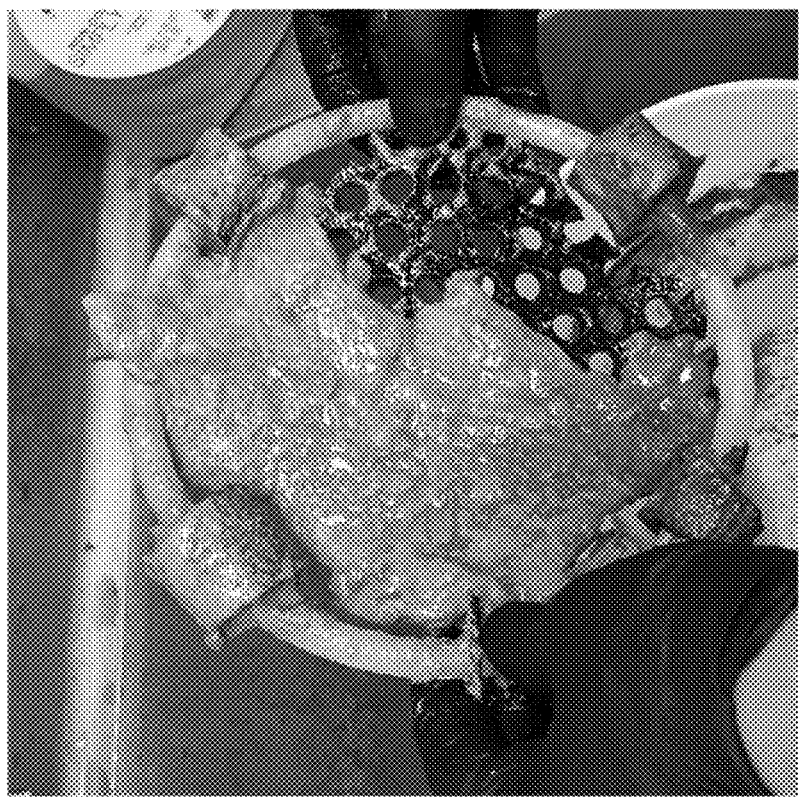

FIGS. 1A-1C show diagrams of example embodiments of FMU device 100 in accordance with the present technology for sulfide removal from diverse types of wastewater, including sewage from domestic infrastructure systems, agricultural and industrial systems. In some embodiments, the FMU device 100 is a separate unit. In other embodiments, the FMU device 100 can be incorporated into an existing water and wastewater treatment unit. In the exemplary embodiment of the FMU device 100 featured in FIGS. 1A-1C, the FMU device 100 is a separate unit.

Referring to FIG. 1A, the FMU device 100 includes or is incorporated with a wastewater holding tank 101 to receive raw wastewater for treatment, e.g., from a facility such as a brewery, farm, or an urban sewage wastewater grid. Connected to wastewater holding tank 101 is an inflow line 102 in which wastewater water flows from a wastewater reservoir into the wastewater holding tank 101 to then be treated. The wastewater holding tank 101 is further connected to an outflow line 103, which enables the wastewater, once treated, to exit the wastewater holding tank 101. In various implementations, the inflow line 102 and outflow line 103 can be positioned anywhere on the wastewater holding tank 101 such that they enable a flow of wastewater in and out of the wastewater holding tank 101.

As shown in the example embodiments shown in FIGS. 1A-1C, the FMU device 100 includes an aeration module 105 (also referred to as an aeration manifold). The aeration module 105 includes a manifold structure having one or more openings to flow air out of an interior of the manifold structure. For example, the manifold structure can be configured as a ring, a polygon (such as a triangle, a rectangle, a pentagon, a hexagon, or an octagon, or other polygon), or other shape or geometry. In the example of FIGS. 1A and 1B, the aeration module 105 is configured as an aeration ring 105A. The aeration ring 105A floats on top of wastewater that is contained in the wastewater holding tank 101. The aeration ring 105A is able to float on top of the wastewater holding tank 101 with the use of a floating support 104, which includes one or more support structures floatable on an aqueous fluid solution. In some embodiments, the aeration ring 105A disposes the floating support 104 in between the wastewater and the aeration ring 105A such that the aeration ring 105A will be floating on top of the wastewater in the holding tank 101. In such embodiments, the floating support 104 can be configured to prevent the aeration ring 105A to not be in direct contact with the wastewater fluid in the wastewater holding tank 101. Whereas, in some embodiments, the floating support 104 can be configured to allow the aeration ring 105A to contact the wastewater. For example, in some embodiments, the floating support 104 may position the aeration ring 105A in the wastewater such that it is at least partially submerged (e.g., half-way into the water); where the extent to which the aeration ring 105A is submerged in the wastewater can depend on the weight of the aeration ring 105A and buoyancy properties of the floating support 104. Notably, in any configurations for the aeration ring 105A to contact the water, the placement of the aeration ring 105A provides a small amount of air at the water-gas surface of the wastewater. In various implementations, the floating support 104 can keep the FMU device 100 on the water surface regardless of the water and/or wastewater volume in the wastewater holding tank 101. This feature allows a variable volume load of the wastewater in the wastewater holding tank 101 and secures a pre-defined distance between the wastewater surface and aeration ring 105A.

In some embodiments, the FMU device 100 includes a lid 106, which provides a volume (e.g., "head space") between the aeration ring 105A and the lid 106 that allows for uniform air distribution on the water and/or wastewater surface. In some embodiments, the lid 106 can move up and down, with respect to the side walls of the container, to increase or decrease the volume of "head space." In some embodiments that include the lid 106, the FMU device 110 includes a hole 110 on top of the lid 106, which allows release for air to flow in and out of the head space, e.g., providing ventilation and preventing pressure build up. The FMU 100 includes an air line 107 to provide air to the aeration ring 105A under controlled parameters. The precise control of the incoming air flow allows a precise micro-dosing of oxygen at the water surface. Micro-oxygen concentration is critical for assuring the right biological conversion of sulfide to elemental sulfur as oppose to sulfate or thiosulfate. The concentration of the oxygen can be regulated (e.g., controlled) by flow control.

In some embodiments, the aeration ring 105A can have two, three, four or greater air lines 107. The air line(s) 107 flows air to the aeration ring 105A and oxygenate the wastewater at the top surface and/or surface layer of the wastewater holding tank 101. In some implementations, the surface layer of the wastewater refers to a depth of about 0 cm to about 5 cm from the top surface of the wastewater surface. For example, the FMU device 100 can facilitate oxidation of sulfide at the wastewater surface layer and/or on the top layer of the wastewater (e.g., 0 cm to about 5 cm from the top surface of the wastewater).

In some embodiments, the FMU device 100 further includes an air pump 109 for constant air supply and a flow meter 108 for precise flow control. The air pump 109 is connected to the flow meter 108. The flow meter 108 is also referred to as a flow controller or a flow actuator and regulates the flow or pressure of the air from the air pump 109. The flow meter 108 operates by changing (e.g., regulating) the flow of the air based on the measured pressure and/or flow of the air, which is then further connected to the airlines 107, which flow into the FMU device 100 to the aeration ring 105A and onto the surface of the wastewater for oxygenation. In some implementations, the amount of air that passes through the flow controller can be evaluated from finite element analyses, as shown and discussed later in FIGS. 3A and 3B.

Referring to FIG. 1B, in some embodiments, the FMU device 100 includes a support material 111 which can float on the wastewater surface and/or can be attached to the aeration ring 105A such that a side of the material 111 is in contact with the wastewater. The support material provides surface area for microbes, e.g., such as bacterial growth. In some embodiments, the support material 111 can include, but is not limited to, perforated carbon textile, plastic mesh, perforated foam, etc. onto which sulfide-oxidizing bacteria create a biofilm. In some embodiments, the support material 111 has about a 90% open structure. In some embodiments, the voids of the support material 111 have a circular shape with a diameter of about 1 to about 2 cm or rectangular shape with size of about 1 to about 4 $cm^2$. In some embodiments, the biofilm of sulfide-oxidizing bacteria is in direct contact with the water and air simultaneously.

In some embodiments, the support material 111 is placed in direct contact with the water surface. In some embodiments, the support material 111 is freely floating on the water surface. In other embodiments, the support material 111 is attached to the aeration ring 105A or the aeration manifold 105B'.

Sulfide-oxidizing bacteria are able to grow on the support material 111, e.g., which ensures higher treatment rates of water flow and/or purification due to the higher abundance of microorganisms necessary for the treatment process.

FIG. 1C shows images of an exemplary FMU device 100 featuring an example of a support material 111 for bacterial growth. As shown in FIG. 1C, on the left, the support material can be completely populated with very dense biofilm. The white color of the biofilm is indicative for sulfate-oxidizing bacteria. FIG. 1C, on the right, shows an early stage of biofilm development where bacteria are growing on the water surface and starting to populate the support material 111.

Figure 1D:
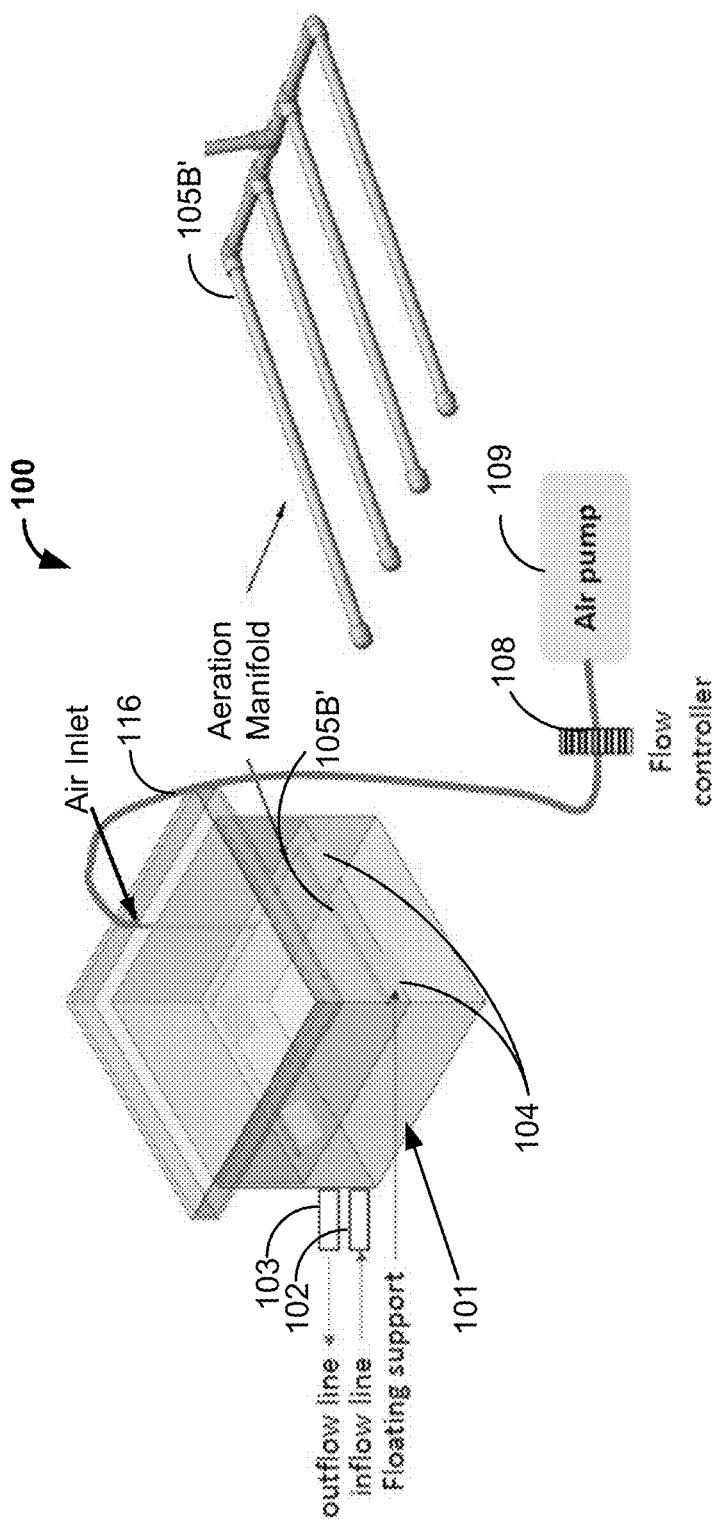
FIGS. 1D and 1E show diagrams of example embodiments of a FMU in accordance with the present technology for sulfide removal from water and/or wastewater bodies and streams.
Figure 1E:
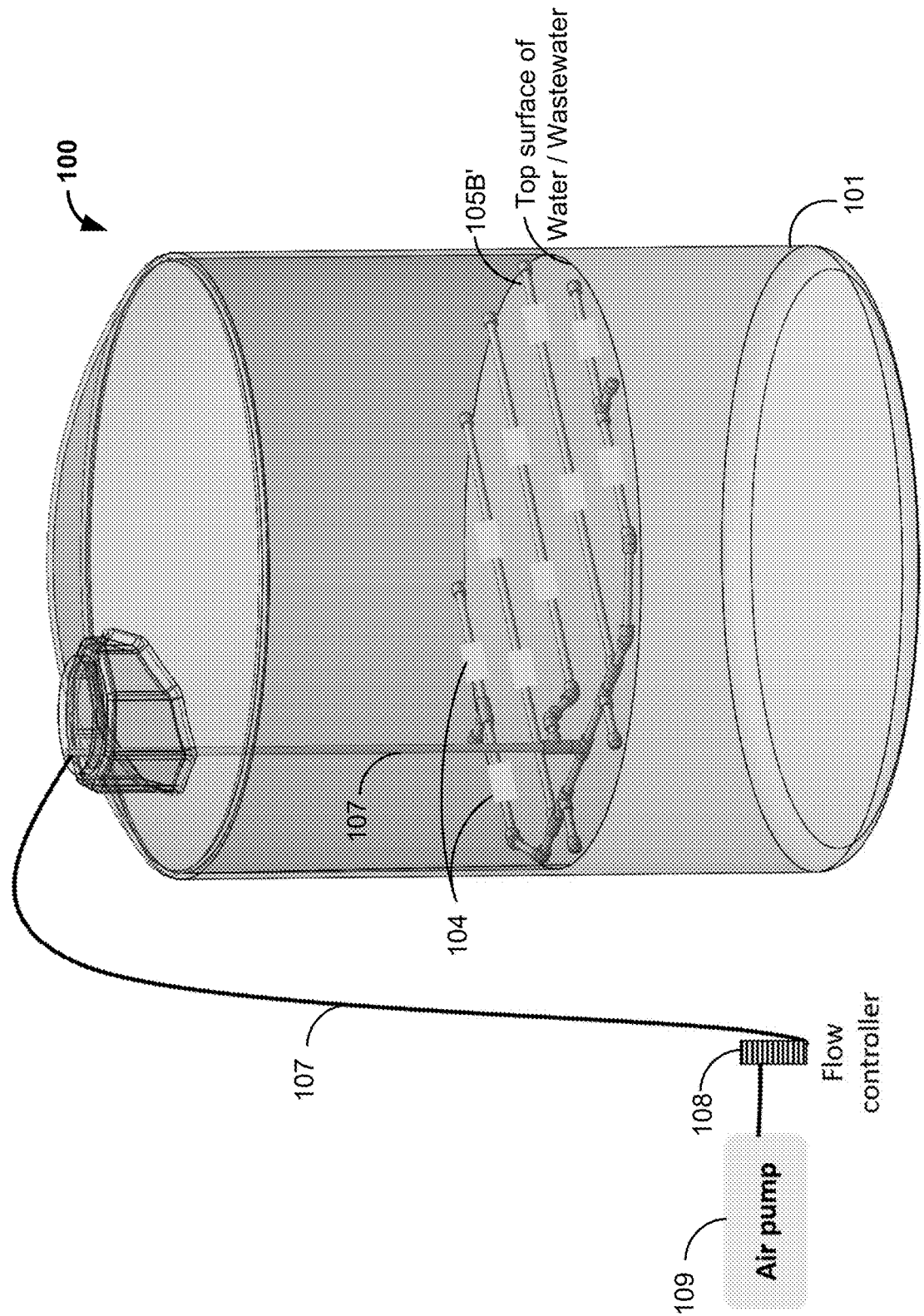

FIGS. 1D and 1E show diagrams of other example embodiments of the FMU device 100 in accordance with the present technology for sulfide removal from water and/or wastewater bodies and streams. As shown in FIGS. 1D and 1E, in some embodiments, the aeration module 105 of the FMU device 100 includes an aeration manifold array 105B including multiple aeration channels. For example, the aeration manifold array 105B includes a plurality of tube structures spanning from a feed tube, where the tube structures have one or more openings to flow air out of an interior of the tube structure. In the example embodiment shown in FIGS. 1D and 1E, the aeration manifold array 105B is able to float on top of the wastewater holding tank 101 with the use of the floating support 104, where the floating support 104 is placed in between the wastewater of the wastewater holding tank 101 and the aeration manifold array 105B, such that the aeration manifold array 105B is kept above the level of the wastewater holding tank 101. The aeration manifold array 105B is connected to an air line 107 to provide air to the aeration manifold. In some embodiments, the example FMU device 100 includes the support material 111, which can float on the wastewater surface and/or can be attached to the aeration manifold array 105B such that a side of the material 111 is in contact with the wastewater. In some embodiments, the example FMU device 100 does not include the support material 111. For example, microbes (e.g., bacteria) can grow on the water surface even in absence of the support material 111, but the support material 111 can facilitate that process and develop a biofilm that is denser.

Figures 2A, 2B:
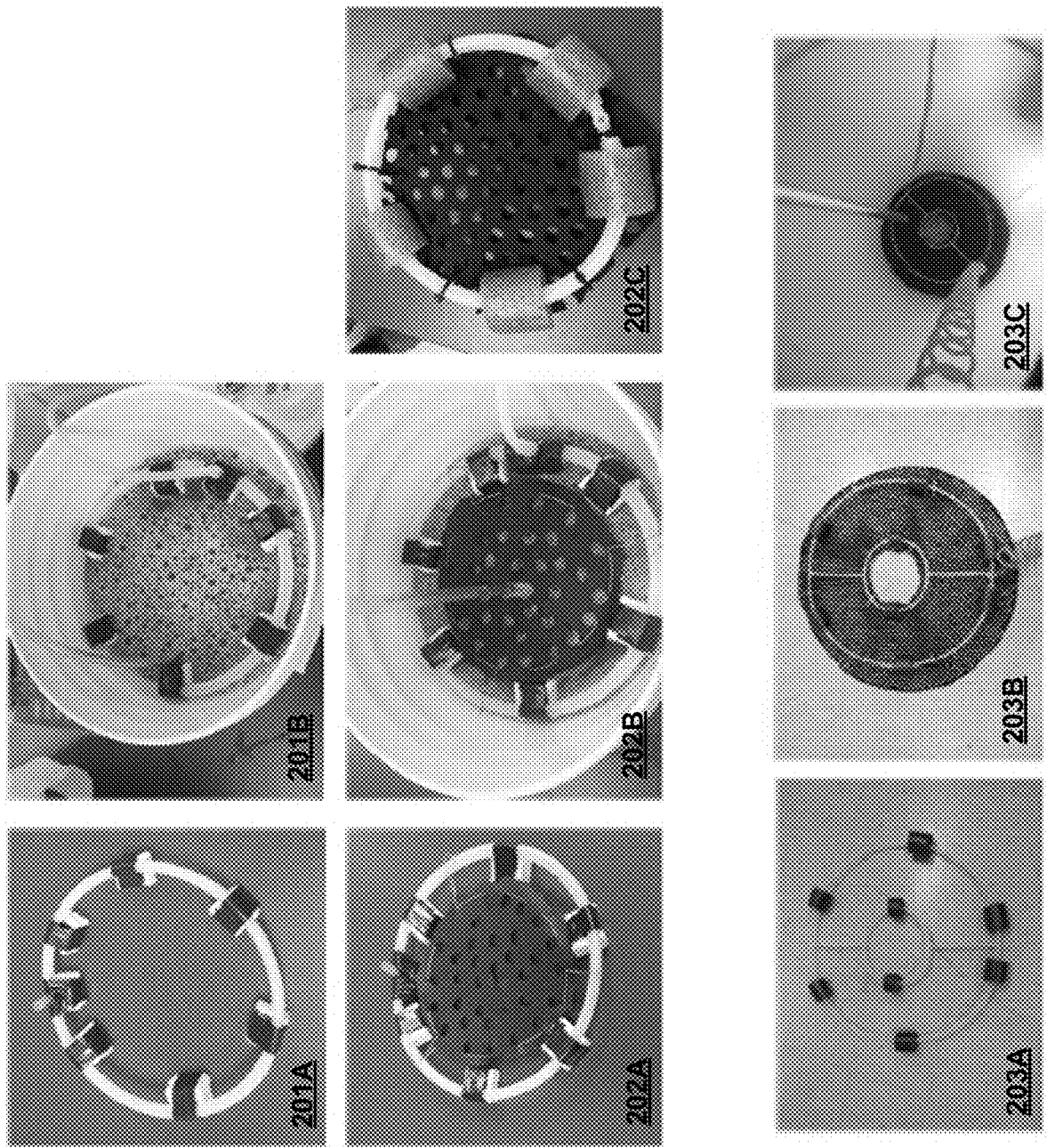
FIGS. 2A and 2B shows images of an FMU device from example implementations with or without a sulfide oxidizing bacteria growth material, respectively.

FIGS. 2A and 2B show images depicting various configurations of an exemplary FMU device 100 at different scales with and without the support material 111, respectively. For example, as shown in FIG. 2A, images 201A and 201B shows an example FMU device 100 without the support material 111 with a dimeter of about 30 cm. Images 202A-202C of FIG. 2A show an example FMU device 100 with the support material 111 with a diameter of 30 cm. As shown in FIG. 2B, image 203A shown an example FMU device 100 without the support material 111 with a dimeter of 1 m, whereas images 203B and 203C show the example FMU device 100 configured with the support material 111. For the FMU device 100 without the support material 111, the bacteria will grow on the surface of the water. For the FMU device 100 with the support material 111, the support material 111 can facilitate the growth process of the bacteria. The FMU device 100 is operable with and without the support material 111.

Figure 2C:
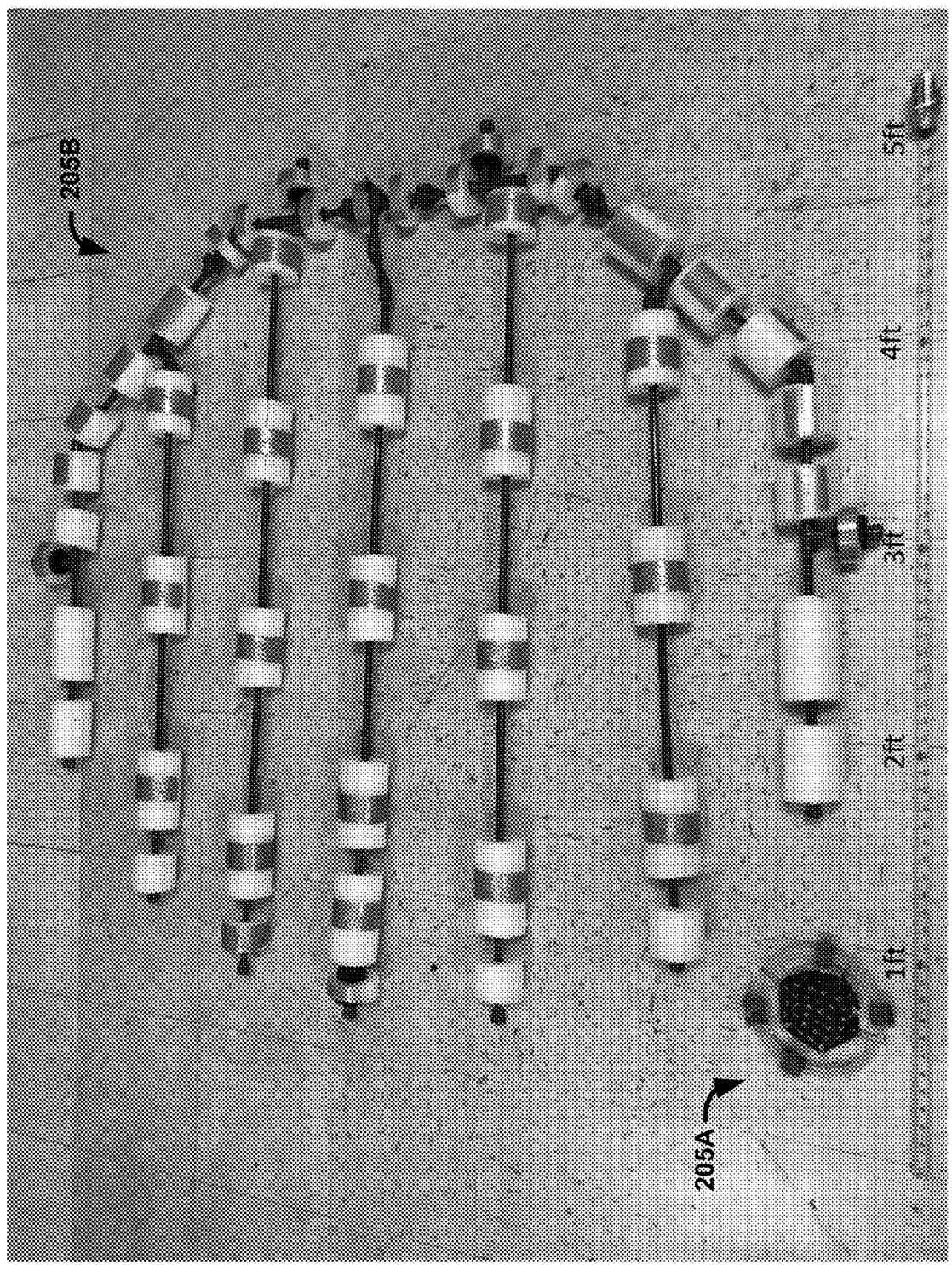
FIG. 2C shows an image of an aeration ring and aeration module of an example implementation of an FMU device.

FIG. 2C demonstrates an example of the FMU device 100 as well as the variations in aeration module 105 design and scale. As shown in FIG. 2C, the example aeration ring, labeled 205A in FIG. 2C, can be approximately 0.5 ft in diameter; and the example aeration manifold array, labeled 205B in FIG. 2C, can have multiple aeration channels of various lengths (e.g., such as up to about 15 ft long, although shown in the image of FIG. 2C to be about 4 ft long).

In some embodiments, the FMU device 100 does not include the wastewater holding tank 101 and is instead incorporated directly into an existing water and/or wastewater treatment unit. For example, the FMU device 100 can include an aeration module including the aeration ring 105A and/or aeration manifold array 105B which is placed directly onto a water source that is not contained within a wastewater holding tank 101. Similar to the exemplary FMU device 100 as depicted in FIGS. 1A-1C, aeration ring 105A can be configured to be in contact with the water at a particular height or not be in direct contact with the water due to the floating support 104.

Figure 3A:
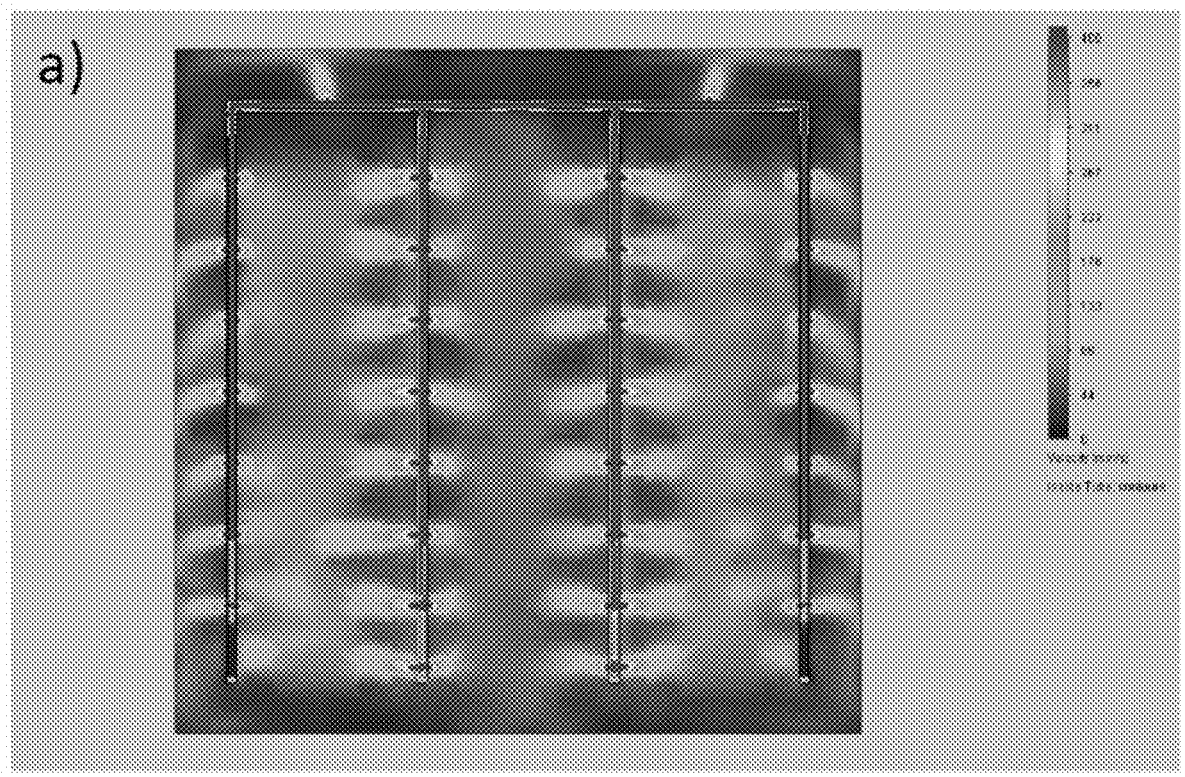
FIGS. 3A and 3B show data plots depicting a flow simulation of the air flow and air distribution at the water and/or wastewater surface of an example FMU device.
Figure 3B:
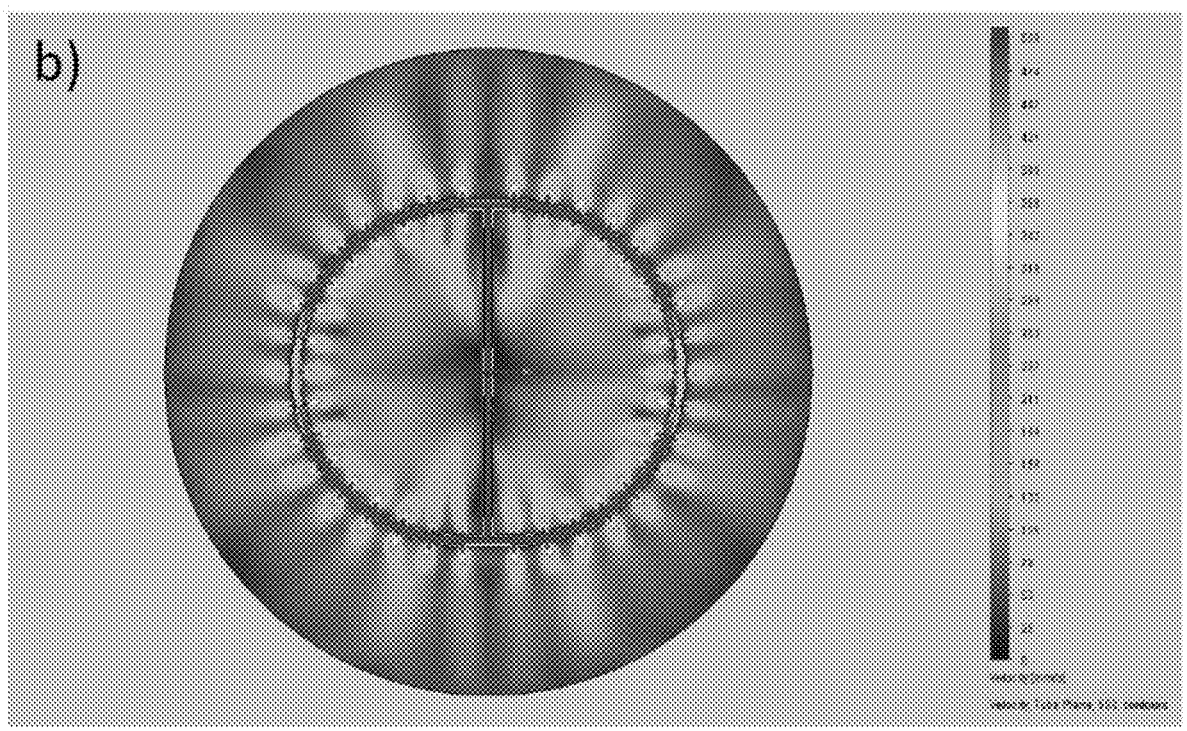

FIGS. 3A and 3B show data plots depicting a flow simulation of the air flow and air distribution at the water and/or wastewater surface of an example embodiment of the FMU device 100. The data plots show the air velocity, the diameter of the aeration tubing as well as the number and position of the holes on the aeration module, which were determined based on flow simulations.

Example Implementations of an FMU System for Brewery Wastewater Treatment

Figure 4:
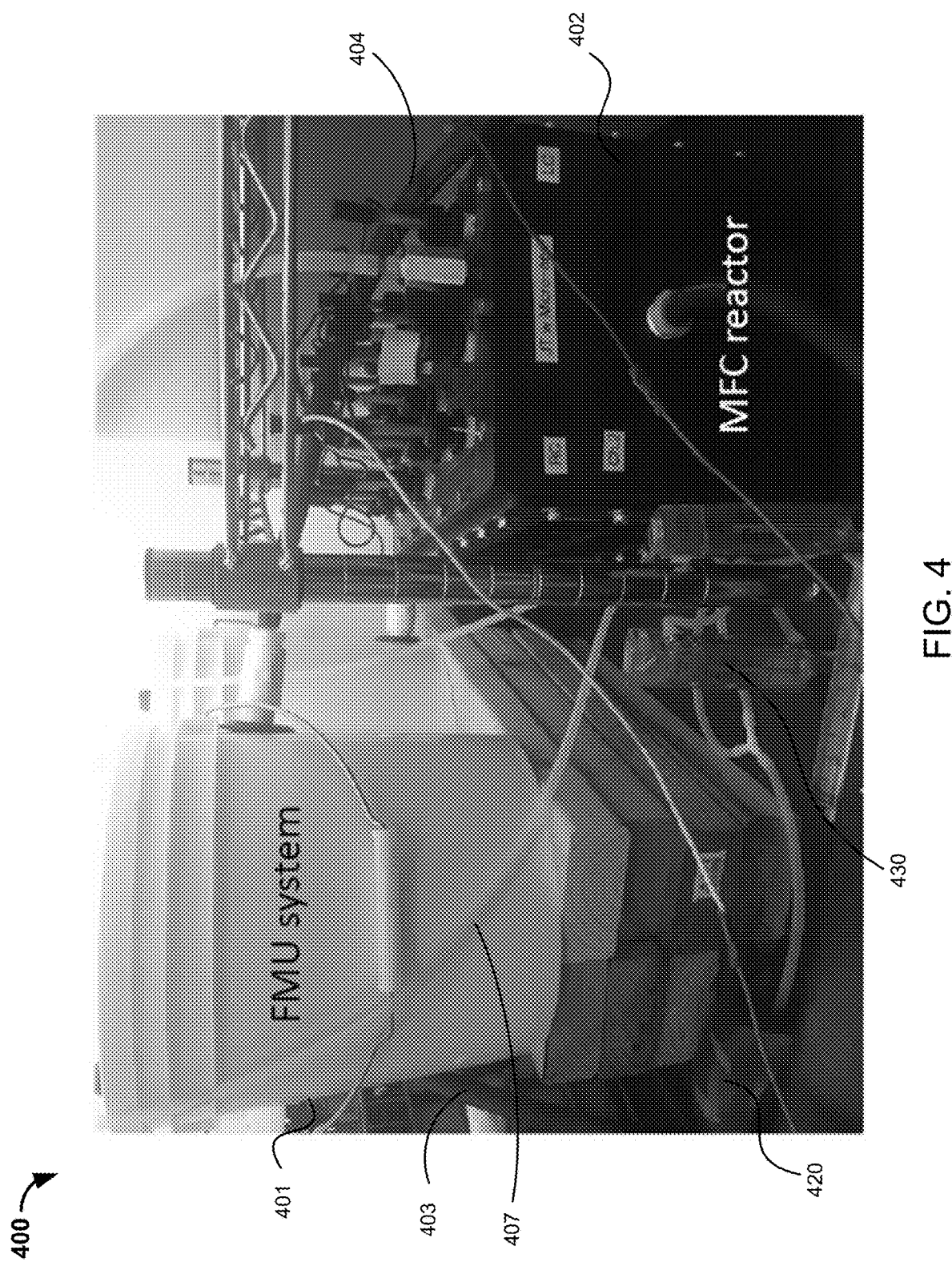
FIG. 4 shows an image of an example embodiment of a FMU device connected to an example microbial fuel cell (MFC) reactor to form a FMU-MFC system, in accordance with some embodiments of the present technology.

FIG. 4 shows an image depicting an example embodiment of a FMU device connected to an example microbial fuel cell (MFC) reactor to form a FMU-MFC system 400, in accordance with some embodiments of the present technology. The image shows the FMU-MFC system 400 configured in an example setup for an experimental implementation.

The FMU-MFC system 400 includes an FMU device 401 in accordance with some embodiments of the FMU device 100 interfaced with an example embodiment of an MFC reactor 402. In the experimental implementation, the example FMU-MFC system 400 was operated for over 80 days in a batch mode with a flow rate 0.1 gallon/minute (gal/min). For example, the FMU device 401 was coupled with the MFC reactor 402 to form the example FMU-MFC system 400 for treatment of brewery wastewater. The system 400 includes an inflow line 404 to supply the water/wastewater to the storage tank of the FMU device 401. The outflow line 403 from the FMU device 401 goes into the MFC reactor 402 for organics removal. As shown in the image, the example FMU device 401 used in the system 400 includes an air line, labeled 407, to supply air to the aeration module (disposed within the container of FMU 401, not shown). In the example embodiment, the system 400 includes an air pump 420 and a flow meter 430 interfaced with the FMU 401. In implementations, for example, the FMU-MFC system 400 can be operated in a batch mode and periodically fed with raw brewery wastewater.

In some example embodiments, the MFC reactor 402 includes a housing and a bioelectrochemical reactor that is encased within the housing. The bioelectrochemical reactor includes a plurality of anodes arranged between a cathode assembly. The cathode assembly can include at least two cathodes that are separated on opposite sides of the plurality of anodes and arranged along a flow direction of the fluid through the bioelectrochemical reactor for the fluid to flow between the two cathodes. In some embodiments, the at least two cathodes of the cathode assembly include gas-diffusion cathodes that are operable to allow oxygen to permeate into the fluid within the biochemical reactor.

Further detail of these and other embodiments of an MFC reactor are described in U.S. Patent Publication No. 2020/0002200A1, titled "SCALABLE CONTINUOUS FLOW MICROBIAL FUEL CELLS," and incorporated by reference as part of this patent disclosure for all purposes.

In the experimental implementation, the performance of the example FMU-MFC system 400 was compared to the performance of MFC reactor 402 without FMU device 401.

The operation of MFC reactor 402 is highly influenced by the presence of sulfide in the system. Sulfide adsorbs on the cathode surface and decreases the catalytic activity of the catalyst. As a result, the cathodic potential of the MFC reactor 402 shifts to significantly negative values coupled with a significant decrease in the cathodic reaction rate. Negative cathodic potentials are not desirable for MFC operation.

The example results from this operation indicate a very stable electrochemical performance of the FMU-MFC system 400 with preserved positive cathodic potential.

Figure 5:
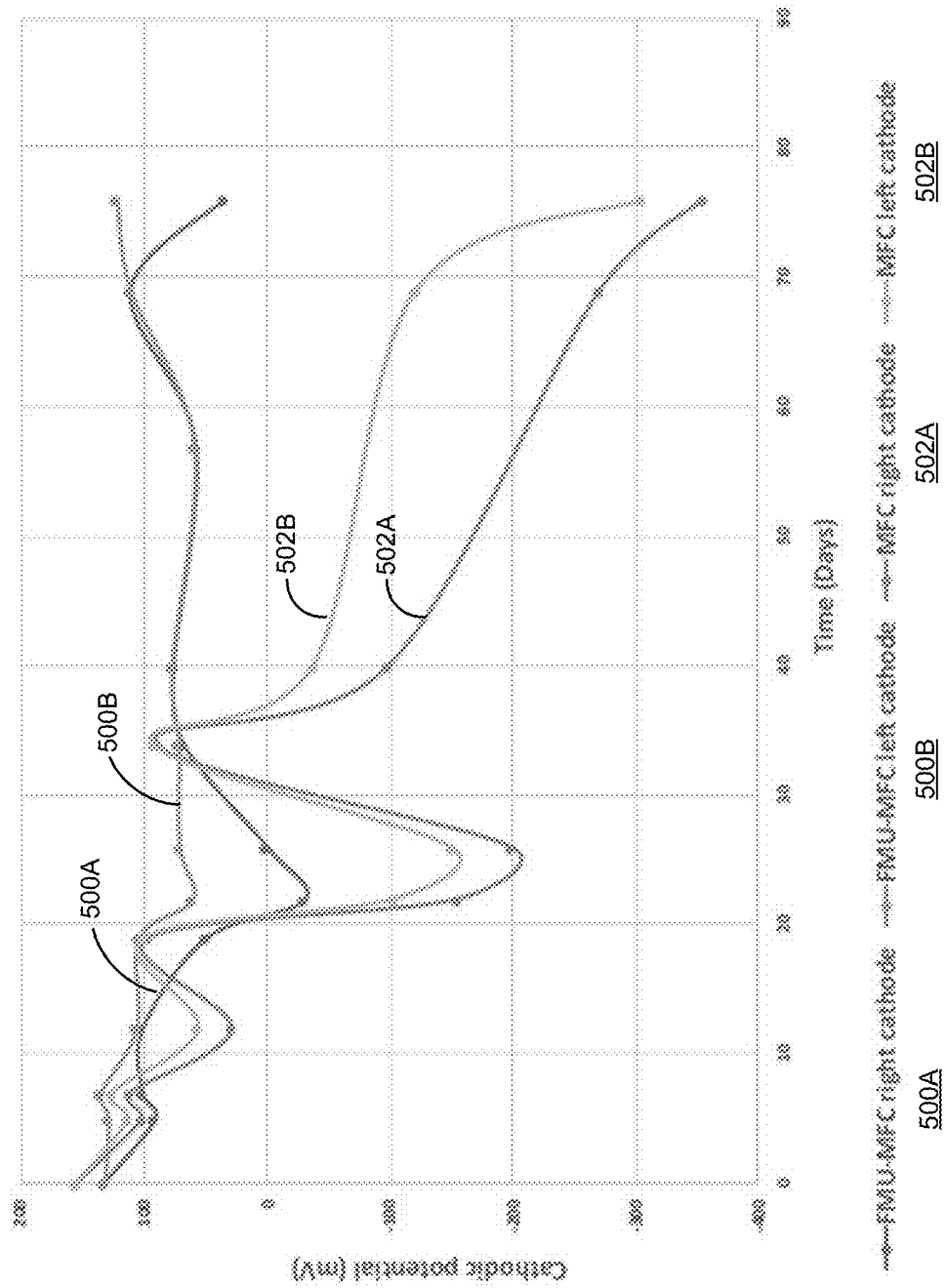
FIG. 5 show data plots depicting cathodic potentials of an example embodiment MFC reactors with and without a FMU device.

FIG. 5 demonstrates the stability of the cathodic potential for FMU-MFC system 400 in comparison to just the MFC reactor 402 without the FMU device 401. Plots 500A and 500B depict the cathodic potential (in mV) of the example FMU-MFC system 400 at the right cathode and the left cathode of the MFC device 402, respectively, for over 75 days of performance. Plots 502A and 502B depict the cathodic potential of the right cathode and the left cathode of the MFC device 402 alone (i.e., no FMU device 401), respectively, for the same time period.

The conversion of sulfate to dissolved sulfide in the example implementations of the FMU-MFC system 400 treating brewery wastewater was determined to be 7%. Therefore, 7% of the sulfate present in the brewery wastewater is converted to sulfide, with the rest of the sulfate remaining in the liquid phase. Some of the remaining sulfate is used for protein synthesis by bacteria or is directly converted to elemental sulfur. At the same time some of the produced sulfide is released in the atmosphere as hydrogen sulfide and a portion of the dissolved sulfide is adsorbed on the cathodic surface. Given the 7% conversion of sulfate to sulfide remaining in the water, the efficiency of the FMU device 401 used in the example FMU-MFC system 400 was calculated to range between 74-100%.

Figure 6:
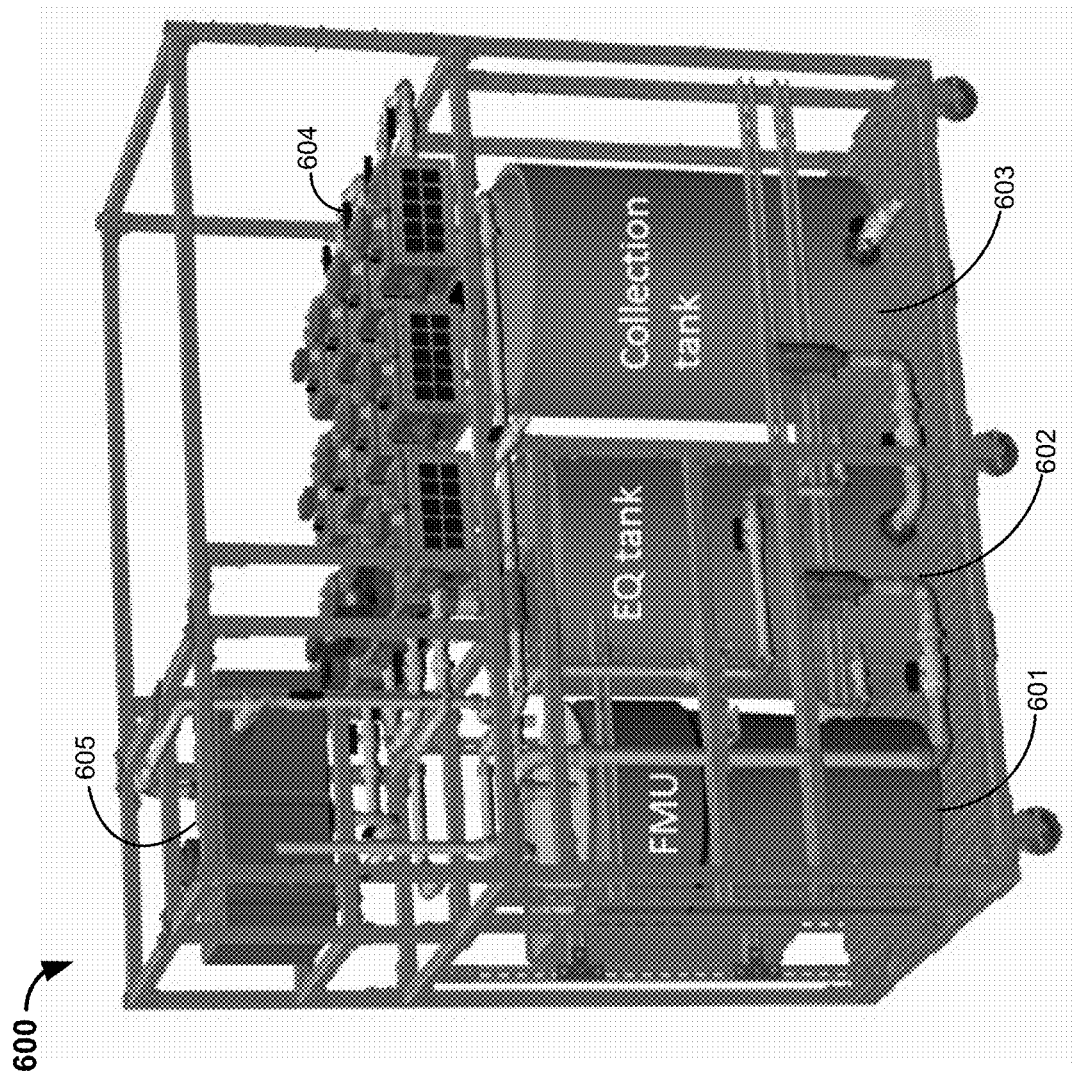
FIG. 6 shows a schematic of an example embodiment of a FMU-MFC system in an example implementation for brewery wastewater treatment.

FIG. 6 shows a diagram illustrating an example FMU-MFC system 600 in accordance with some embodiments of the FMU-MFC system 400. Example implementations are described of the example FMU-MFC system 600, which is installed as a pretreatment unit in a pilot installation treating 150 gpd brewery wastewater at a brewery located in California.

The FMU-MFC system 600 can be disposed on a cart-on-wheels or other moveable structure to allow the FMU-MFC system 600 to be transportable. The FMU-MFC system 600 includes a FMU device 601 in accordance with example embodiments of the FMU device 100, an equalization (EQ) tank 602, a collection tank 603, an array of MFC reactors 604 (e.g., shown in an array configuration in this example), and a feeder box 605. In this example, the FMU device 601 is a separate unit composed of a 75 gal tank, air pump in accordance with the air pump 109, a flow meter in accordance with the flow meter 108, an aeration module in accordance with the aeration ring 105, and a foam support material in accordance with the support material 111 for bacterial growth. In this example, the FMU device 601 is positioned adjacent to and is in operative communication with the EQ tank 602; and the EQ tank 602 is adjacent to the collection tank 603. The feeder box 605 is in operative communication with the FMU device 601 and the MFC reactors 604.

In example implementations to operate the FMU-MFC system 600, the brewery wastewater flows from the EQ tank 602 into the FMU device 601 at a flow rate of 0.1 gpm. The wastewater is then transferred from the FMU device 601 to the system feeder box 605 and from there into the MFCs reactors 604. The outflow from the MFC reactors 604 flows back into the EQ tank 602 during batch operation and into the collection tank 603 during continuous operation, for example. The hydraulic residence time of the wastewater in the FMU system 600 is 4 hours. Periodically raw wastewater is introduced in the pilot FMU system 601.

Figure 7:
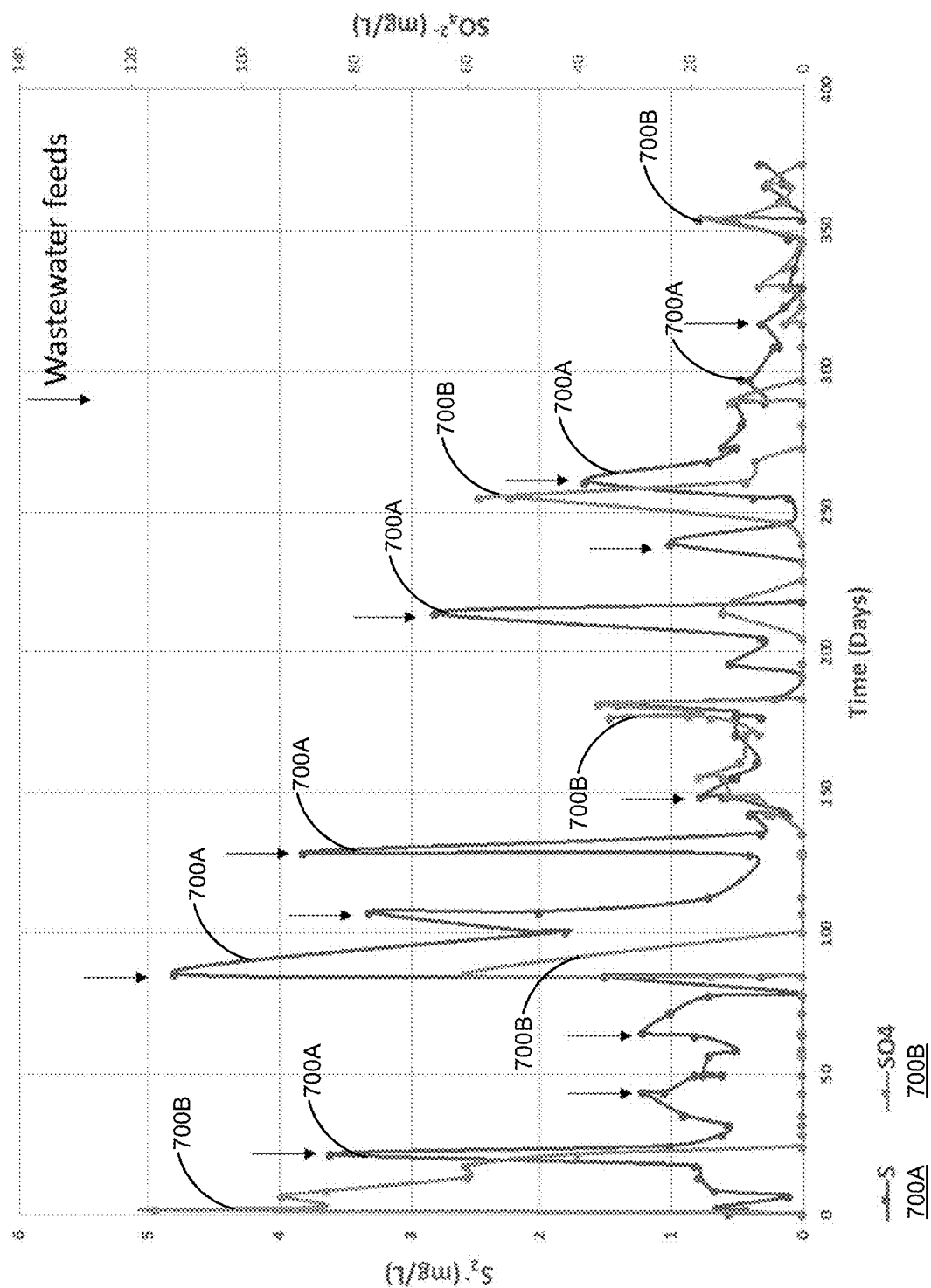
FIG. 7 shows data plots depicting sulfate and sulfide concentrations over time of the example FMU-MFC system in FIG. 6 for treating brewery wastewater.

FIG. 7 shows data plots depicting sulfate ($SO_4^{2-}$) and sulfide ($S^{2-}$) concentrations over time for the pilot installation of the example FMU-MFC system 600. Plots 700A and 700B depict the concentration of sulfide and sulfate in the brewery wastewater, respectively, for over 350 days of performance. Additions of new wastewater is indicated with arrows in FIG. 7. As shown in the data plot, any new wastewater addition increased either the sulfide or sulfate levels. The data plot of FIG. 7 demonstrates that the example FMU system 601 successfully reduced or completely removed the sulfate and sulfide present in the wastewater. The efficiency of FMU unit was in the range of 71-100%.

Figure 8A:
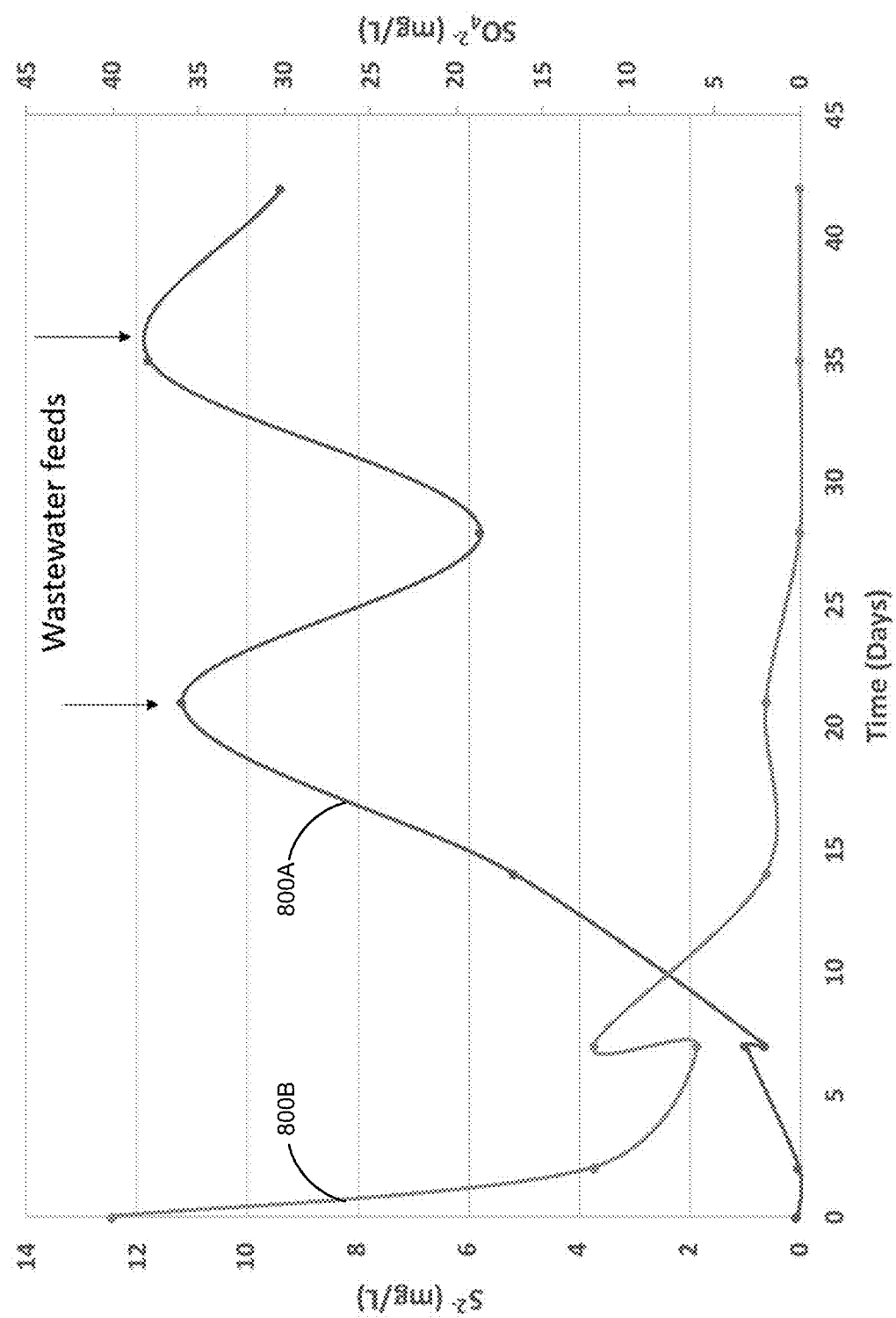
FIGS. 8A and 8B show data plots depicting sulfate and sulfide concentrations over time of an example FMU-MFC system in an example implementation for treating food processing wastewater.
Figure 8B:
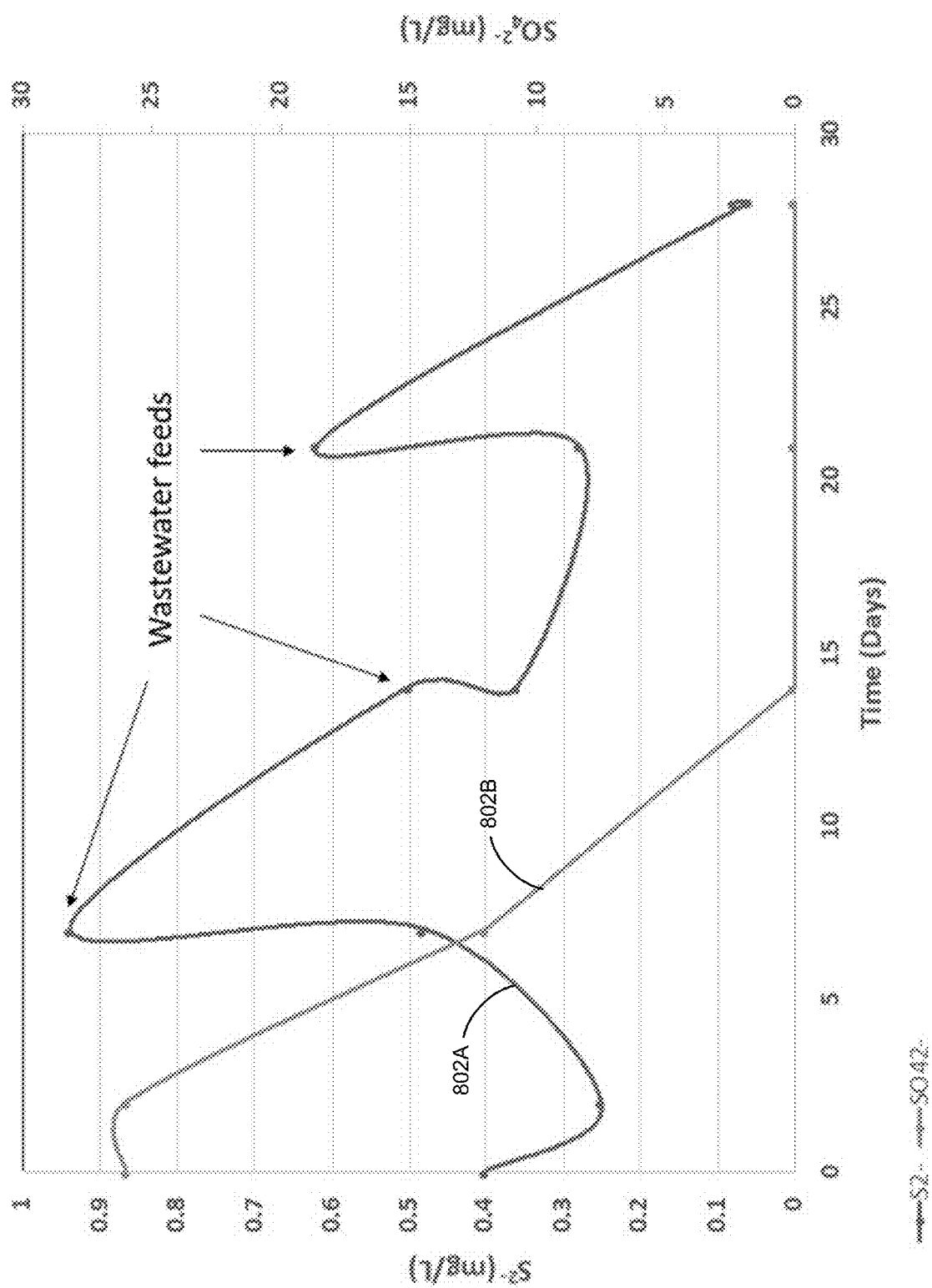

Example Implementations of the FMU System for Food Processing Wastewater Treatment FIGS. 8A and 8B show data plots depicting sulfate ($SO_4^{2-}$) and sulfide ($S^{2-}$) concentrations over time measured from an example FMU-MFC system like in FIG. 4 that was utilized in an example implementation for treating food processing wastewater. In FIG. 8A, the plots 800A and 800B depict the concentration of sulfide and sulfate in the food processing wastewater, respectively, for over 40 days of performance. In FIG. 8B, the plots 802A and 802B depict the concentration of sulfide and sulfate in the food processing wastewater, respectively, for over 25 days of performance. The example FMU-MFC system utilized in the example food processing wastewater treatment implementations included the FMU device 401 interfaced with the MFC reactor 402, similar to that illustrated in FIG. 4.

The data plot of FIG. 8A demonstrates the sulfate and sulfide removal from the example FMU-MFC system 400 treating wastewater from tofu and spaghetti sauce production. The high protein content of this wastewater type causes the sulfide concentrations to increase significantly to levels above 10 mg/L when the wastewater is introduced into the example FMU-MFC system. It was estimated that the FMU device reduced the sulfide concentration by 50% and sulfate concentration by 100%.

The data plot of FIG. 8B shows the sulfide and sulfate profiles for the FMU-MFC system treating wastewater from tomato juice production. It was estimated that the FMU device reduced the sulfide concentration by up to 90% and sulfate concentration by 100%.

Examples

In some embodiments in accordance with the disclosed technology (example A1), a system for sulfide removal from a water or wastewater solution includes a manifold structure including one or more opening to flow air out of an interior of the manifold structure; one or more support structures connected to the manifold structure, wherein the one or more support structures are floatable on a surface of a fluid including a water or wastewater solution in a container so that the manifold structure does not contact the water or wastewater solution; and an air source that flows air to the manifold structure to oxidize sulfide on the surface of the water or wastewater solution.

Example A2 includes the system of any of examples A1-A18, wherein the sulfide is oxidized to elemental sulfur and removed from the water or wastewater solution.

Example A3 includes the system of any of examples A1-A18, the air source includes a pump.

Example A4 includes the system of example A3, wherein the pump is further connected to a tube that supplies air to the aeration ring.

Example A5 includes the system of any of examples A1-A18, further including a flow meter to control a rate of air flow.

Example A6 includes the system of any of examples A1-A18, wherein the manifold structure is configured as a ring.

Example A7 includes the system of any of examples A1-A18, further including a material coupled to the manifold structure and to allow for sulfide-oxidizing bacteria to grow.

Example A8 includes the system of example A7, wherein the material includes a perforated carbon textile, a plastic mesh, or a perforated foam.

Example A9 includes the system of example A7, wherein the material is operable to float on the surface of the water or wastewater solution.

Example A10 includes the system of any of examples A1-A18, wherein the one or more openings of the manifold structure provide uniform air distribution on the surface of the water or wastewater solution.

Example A11 includes the system of any of examples A1-A18, wherein the manifold structure includes a flexible tubing.

Example A12 includes the system of any of examples A1-A18, wherein the manifold structure includes a rigid tubing.

Example A13 includes the system of any of examples A1-A18, wherein the one or more support structures is porous, biocompatible, and/or inert in water.

Example A14 includes the system of any of examples A1-A18, wherein the one or more support structures includes a foam.

Example A15 includes the system of any of examples A1-A18, the water or wastewater solution is held in a tank.

Example A16 includes the system of example A15, wherein the tank is interfaced with an inlet line through which the water or wastewater can flow into the tank and an outlet line through which, once treated, the water or wastewater can flow out of the tank.

Example A17 includes the system of any of examples A1-A18, wherein the manifold structure, the one or more support structures, and the air source are contained within a unit.

Example A18 includes the system of any of the preceding examples A1-A17, wherein the water or wastewater solution includes sewage received from a domestic infrastructure system, agricultural system, or industrial system.

In some embodiments in accordance with the disclosed technology (example B1), a system for sulfide removal from water or wastewater includes a manifold structure including one or more openings to flow air out of an interior of the manifold structure; one or more support structures connected to the manifold structure, wherein the one or more support structures are floatable on a surface of a fluid including water or wastewater; and an air source configured to supply air to the manifold structure to be flowed out from the manifold structure through the one or more openings at the fluid to facilitate sulfide in the fluid to oxidize, wherein the air flowed out of the interior manifold structure includes an amount of oxygen gas comprising less than 0.1 mg/L of oxygen ($O_2$).

Example B2 includes the system of any of examples B1-B25, wherein the system is operable to flow the air at a top surface of the fluid to a shallow depth within a range of 0 cm to 5 cm within the fluid.

Example B3 includes the system of any of examples B1-B25, wherein the manifold structure includes multiple channels for the air to flow out of an interior of the manifold structure.

Example B4 includes the system of any of examples B1-B25, wherein the sulfide is oxidized to elemental sulfur and removed from the water or wastewater solution.

Example B5 includes the system of any of examples B1-B25, the air source includes a pump.

Example B6 includes the system of any of examples B1-B25, wherein the pump is further connected to a tube that supplies air to the manifold structure.

Example B7 includes the system of any of examples B1-B25, wherein the system further includes a flow meter to control a rate of air flow.

Example B8 includes the system of any of examples B1-B25, wherein the manifold structure is configured as a ring or a polygon.

Example B9 includes the system of any of examples B1-B25, wherein the manifold structure is configured as a plurality of tube structures spanning from a feed tube, where the tube structures have one or more openings to flow air out of an interior of the tube structure.

Example B10 includes the system of any of examples B1-B25, wherein the system further includes a support material coupled to the manifold structure to facilitate growth of sulfide-oxidizing bacteria to create a biofilm.

Example B11 includes the system of any of examples B1-B25, wherein the support material includes a perforated carbon textile, a plastic mesh, or a perforated foam.

Example B12 includes the system of any of examples B1-B25, wherein the support material is operable to float on the surface of the fluid.

Example B13 includes the system of any of examples B1-B25, wherein the support material includes a plurality of openings such that the support material has an open structure up to 90% of the structure.

Example B14 includes the system of any of examples B1-B25, wherein the one or more openings of the manifold structure are configured to provide uniform air distribution on the surface of the fluid including the water or wastewater.

Example B15 includes the system of any of examples B1-B25, wherein the manifold structure includes a flexible tubing.

Example B16 includes the system of any of examples B1-B25, wherein the manifold structure includes a rigid tubing.

Example B17 includes the system of any of examples B1-B25, wherein the one or more support structures is porous, biocompatible, and/or inert in water.

Example B18 includes the system of any of examples B1-B25, wherein the one or more support structures includes a foam.

Example B19 includes the system of any of examples B1-B25, wherein the system includes a container to hold the fluid.

Example B20 includes the system of any of examples B1-B25, wherein the container is interfaced with an inlet line through which the fluid can flow into the container and an outlet line through which, once treated, the fluid can flow out of the container.

Example B21 includes the system of any of examples B1-B25, wherein the manifold structure is raised above the fluid by the one or more supporting structures so that the one or more openings of the manifold structure does not contact the fluid.

Example B22 includes the system of any of examples B1-B25, wherein the manifold structure, the one or more support structures, and the air source are contained within a single unit.

Example B23 includes the system of any of examples B1-B25, wherein the water or wastewater includes sewage received from a domestic infrastructure system, agricultural system, or industrial system.

Example B24 includes the system of any of examples B1-B25, wherein the fluid containing the water or wastewater is contained within a vessel and the one or more support structures are floatable on the surface the fluid in the vessel.

Example B25 includes the system of any of examples B1-B24, wherein the system is configured to feed an output fluid from the system to a microbial fuel cell (MFC) reactor.

In some embodiments in accordance with the disclosed technology (example B26), a method of removing sulfide from a fluid containing water or wastewater includes contacting a fluid containing water or wastewater with a manifold structure that includes one or more openings to flow air out of an interior of the manifold structure, wherein the manifold structure is positioned with respect to the fluid based on one or more support structures connected to the manifold structure and configured to float on the fluid; flowing air out of the interior of the manifold structure to supply an amount of oxygen gas comprising less than 0.1 mg/L of oxygen ($O_2$) to the fluid; and converting the sulfide of the fluid to elemental sulfur.

Example B27 includes the method of any of examples B26-B36, wherein the fluid includes sulfide-oxidizing bacteria.

Example B28 includes the method of any of examples B26-B36, wherein the flowing the air out of the interior of the manifold structure includes supplying the amount of oxygen gas comprising less than 0.1 mg/L of $O_2$ at a top surface of the fluid to a shallow depth within a range of 0 cm to 5 cm within the fluid.

Example B29 includes the method of any of examples B26-B36, comprising regulating air flow with a flow meter for flowing air out of the interior of the manifold structure.

Example B30 includes the method of any of examples B26-B36, wherein the air flow is regulated such that a concentration of oxygen introduced into the fluid containing the water or wastewater does not exceed about 0.1 mg/L.

Example B31 includes the method of any of examples B26-B36, comprising providing a support material coupled to the manifold structure to facilitate growth of sulfide-oxidizing bacteria on the support material to create a biofilm.

Example B32 includes the method of any of examples B26-B36, wherein the method does not convert sulfide to sulfate, thiosulfate, or combination thereof.

Example B33 includes the method of any of examples B26-B36, wherein the sulfide is hydrogen sulfide.

Example B34 includes the method of any of examples B26-B34 or B36, wherein the manifold structure is raised above the fluid by the one or more supporting structures such that the one or more openings of the manifold structure does not contact the fluid.

Example B35 includes the method of any of examples B26-B34 or B36, wherein the manifold structure is positioned with respect to the fluid by the one or more supporting structures such that the one or more openings of the manifold structure contact the fluid at a surface of the fluid or are at least partially submerged in the fluid.

Example B36 includes the method of any of examples B26-B35, wherein the method is implemented by the system of any one of examples B1 to B25, by the system of any one of examples A1-A18, by the device of any one of examples C1 to C15, or by the system of any one of examples D1-D8.

In some embodiments in accordance with the disclosed technology (example C1), a device for sulfide removal from water or wastewater includes a manifold structure including one or more openings to flow air out of an interior of the manifold structure; one or more support structures connected to the manifold structure, wherein the one or more support structures are floatable on a surface of a fluid including water or wastewater; and an air source configured to supply air to the manifold structure to be flowed out from the manifold structure through the one or more openings at the fluid to facilitate sulfide in the fluid to oxidize, wherein the air supplied by the air source to the manifold structure includes an amount of oxygen gas comprising less than 0.1 mg/L of oxygen ($O_2$).

Example C2 includes the device of any of examples C1-C15, wherein the device is operable to flow the air at a top surface of the fluid to a shallow depth within a range of 0 cm to 5 cm within the fluid.

Example C3 includes the device of any of examples C1-C15, wherein the manifold structure includes multiple channels for the air to flow out of the interior of the manifold structure.

Example C4 includes the device of any of examples C1-C15, wherein the air source includes a pump in connection to a tube that supplies air to the manifold structure.

Example C5 includes the device of any of examples C1-C15, further comprising a flow meter to control a rate of air flow.

Example C6 includes the device of any of examples C1-C15, wherein the manifold structure is configured to have a ring geometry or a polygon geometry.

Example C7 includes the device of any of examples C1-C15, wherein the manifold structure includes a plurality of tubular structures spanning from a feed tube, where the tubular structures have the one or more openings to flow air out of the interior of the tubular structure.

Example C8 includes the device of any of examples C1-C15, further comprising a support material coupled to the manifold structure to facilitate growth of sulfide-oxidizing bacteria to create a biofilm, wherein the support material includes a plurality of openings such that the support material has an open structure up to 90% of the structure.

Example C9 includes the device of any of examples C1-C15, wherein the support material includes a perforated carbon textile, a plastic mesh, or a perforated foam.

Example C10 includes the device of any of examples C1-C15, wherein the support material is configured to float on the surface of the fluid.

Example C11 includes the device of any of examples C1-C15, wherein the one or more support structures is porous, biocompatible, and/or inert in water.

Example C12 includes the device of any of examples C1-C15, wherein the one or more support structures includes a foam.

Example C13 includes the device of any of examples C1-C15, including a container to hold the fluid, wherein the container is interfaced with an inlet line through which the fluid can flow into the container and an outlet line through which, once treated, the fluid can flow out of the container.

Example C14 includes the device of any of examples C1-C15, wherein the manifold structure is raised above the fluid by the one or more supporting structures so that the one or more openings of the manifold structure does not contact the fluid.

Example C15 includes the device of any of examples C1-C14, wherein the one or more openings of the manifold structure is configured to provide uniform air distribution on the surface of the fluid.

In some embodiments in accordance with the disclosed technology (example D1), a system for sulfide removal from and treatment of wastewater includes a container configured to hold a fluid including a wastewater, wherein the container is interfaced with an inlet line through which the fluid can flow into the container and an outlet line through which, once pre-treated, the fluid can flow out of the tank as a pre-treated fluid; a micro-aeration device configured to float on the fluid, the micro-aeration device comprising (i) a manifold structure including one or more openings to flow air out of an interior of the manifold structure, (ii) one or more support structures connected to the manifold structure, wherein the one or more support structures are floatable on a surface of the fluid, and (iii) an air source configured to supply air to the manifold structure to be flowed out from the manifold structure through the one or more openings at the fluid to facilitate conversion of sulfide in the fluid to elemental sulfur to produce the treated fluid, wherein the air supplied by the air source to the manifold structure includes an amount of oxygen gas comprising less than 0.1 mg/L of oxygen ($O_2$); and a microbial fuel cell (MFC) device configured to receive the pre-treated fluid via the outlet line, the MFC device configured to bioelectrochemically process the pre-treated fluid to concurrently generate electrical energy and digest organic matter in the pre-treated fluid to yield a treated water, wherein the MFC device comprises a housing, and a bioelectrochemical reactor encased within the housing, the bioelectrochemical reactor including a plurality of anodes arranged between a cathode assembly that comprises two cathodes separated on opposite sides of the plurality of anodes and arranged along a flow direction of the pre-treated fluid.

Example D2 includes the system of any of examples D1-D8, wherein the micro-aeration device is operable to flow the air at a top surface of the fluid to a shallow depth within a range of 0 cm to 5 cm within the fluid.

Example D3 includes the system of any of examples D1-D8, wherein the micro-aeration device further includes a flow meter to control a rate of air flow.

Example D4 includes the system of any of examples D1-D8, wherein the micro-aeration device further includes a support material coupled to the manifold structure to facilitate growth of sulfide-oxidizing bacteria to create a biofilm, wherein the support material includes a plurality of openings such that the support material has an open structure up to 90% of the structure.

Example D5 includes the system of any of examples D1-D8, wherein the manifold structure includes multiple channels for the air to flow out of the interior of the manifold structure.

Example D6 includes the system of any of examples D1-D8, wherein the manifold structure is configured to have a ring geometry or a polygon geometry.

Example D7 includes the system of any of examples D1-D8, wherein the manifold structure includes a plurality of tubular structures spanning from a feed tube, where the tubular structures have the one or more openings to flow air out of the interior of the tubular structure.

Example D8 includes the system of any of examples D1-D8, wherein the two cathodes of the cathode assembly include gas-diffusion cathodes that are operable to allow oxygen to permeate into the pre-treated fluid within the biochemical reactor.

Further example embodiments in accordance with the present technology are described.

In some embodiments, a floating micro-aeration (FMU) system for sulfide removal from water and/or wastewater solutions includes: (a) a tank for receiving the raw wastewater with an inflow and outflow line; (b) a FMU device, an air pump to provide air flow at a constant rate, and a flow meter to control the air flow.

In some embodiments of the system, the FMU device includes an air ring or manifold, a floating support, and a perforated foam material. In some embodiments of the system, the FMU device is further connected to an air pump with spiral tubing. In some embodiments of the system, the air flow to the FMU device is controlled using a flow meter. In some embodiments, the FMU system includes an air ring or manifold that provides a uniform air distribution on the surface of the water. The air ring or manifold provides the uniform air distribution through the incorporation of holes on the side of the air ring or manifold which allow air to escape from the FMU system. In some embodiments, the air ring or manifold is flexible or rigid tubing. In some embodiments, the floating support is a highly porous biocompatible foam material that is inert in water. In some embodiments, the foam material provides surface area for bacteria growth and/or floats on the water surface. In some embodiments, the wastewater includes sewage received from a domestic infrastructure system, agriculture system, or industrial system.

It is intended that the specification, together with the drawings, be considered exemplary only, where exemplary means an example. As used herein, the singular forms "a", "an" and "the" are intended to include the plural forms as well, unless the context clearly indicates otherwise. Additionally, the use of "or" is intended to include "and/or", unless the context clearly indicates otherwise.

While this patent document contains many specifics, these should not be construed as limitations on the scope of any invention or of what may be claimed, but rather as descriptions of features that may be specific to particular embodiments of particular inventions. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described and other implementations, enhancements and variations can be made based on what is described and illustrated in this patent document.

What is claimed is:

1. A device for sulfide removal from water or wastewater, comprising:
   a manifold structure including a plurality of openings to flow air out of an interior of the manifold structure;
   one or more support structures connected to the manifold structure, wherein the one or more support structures are configured to float the manifold structure on a surface of a fluid, which is a water or wastewater, or to partially submerge the manifold structure below the surface of the fluid;
   an air source configured to supply air to the manifold structure to be flowed out from the manifold structure through the plurality of openings at the fluid to facilitate sulfide in the fluid to oxidize; and
   a support material coupled to the manifold structure to facilitate growth of sulfide-oxidizing bacteria to create a biofilm, wherein the support material includes a plurality of voids such that the support material enables the sulfide-oxidizing bacteria to be in direct contact with the fluid at or below the surface,
   wherein the device is configured to expel the air from the plurality of openings of the manifold structure at the fluid to remove sulfide from the fluid by micro-aeration, such that the air supplied by the air source is configured to provide an amount of oxygen gas within a shallow depth of the fluid between 0 cm to 5 cm from a top surface of the fluid, and wherein the amount of the oxygen gas in the air expelled from the device within the shallow depth of the fluid comprises less than 0.1 mg/L of oxygen ($O_2$).

2. The device of claim 1, wherein the support material is disposed on the manifold structure to contact the surface of the fluid on a bottom side of the support material and to be in contact with air on a top side of the support material.

3. The device of claim 1, wherein at least some voids of the plurality of voids of the support material have a circular shape with a diameter in a range of 1 cm to 2 cm.

4. The device of claim 1, wherein at least some voids of the plurality of voids of the support material have a rectangular shape with an area in a range of 1 $cm^2$ to 4 $cm^2$.

5. The device of claim 1, wherein the device is configured to expel the air from the plurality of openings of the manifold structure (i) above the top surface of the fluid, (ii) within the shallow depth of the fluid, or (iii) both above the top surface of the fluid and within the shallow depth of the fluid.

6. The device of claim 1, wherein the manifold structure includes multiple channels for the air to flow out of the interior of the manifold structure.

7. The device of claim 1, wherein the manifold structure is configured to have a ring geometry or a polygon geometry.

8. The device of claim 1, wherein the air source includes a pump in connection to a tube that supplies air to the manifold structure.

9. The device of claim 8, further comprising:
   a flow meter to control a rate of air flow.

10. The device of claim 1, wherein the support material includes at least one of a perforated carbon textile, a plastic mesh, or a perforated foam.

11. The device of claim 1, wherein the support material is configured to float on the surface of the fluid.

12. The device of claim 1, wherein the one or more support structures is one or more of (i) porous, (ii) biocompatible, or (iii) inert in water.

13. The device of claim 1, further comprising:
    a container to hold the fluid, wherein the container is interfaced with an inlet line through which the fluid can flow into the container and an outlet line through which, once treated, the fluid can flow out of the container.

14. The device of claim 13, further comprising:
    a lid to at least partially cover the container and define a volume in the container between the manifold structure and the lid that allows for uniform distribution of the air (i) at the top surface of the fluid, (ii) at the shallow depth below the top surface of the fluid, or (iii) both at the top surface and at the shallow depth of the fluid.

15. The device of claim 13, wherein the device is operable to micro-aerate the fluid in the container by expelling air out of the plurality of openings of the manifold structure to supply the air within the shallow depth of the fluid to convert sulfide in the fluid in the container to elemental sulfur.

16. The device of claim 15, wherein the device is operable to convert the sulfide in the fluid to the elemental sulfur without conversion of the sulfide to sulfate, thiosulfate, or a combination thereof.

17. The device of claim 1, wherein the plurality of openings of the manifold structure are structured to provide uniform air distribution through the fluid as the air exits individual openings of the plurality of openings at the fluid.

18. The device of claim 1, wherein the manifold structure, the one or more support structures, the air source, and the support material are configured as a single unit.

19. The device of claim 1, wherein the support material is able to facilitate creation of the biofilm by the sulfide-oxidizing bacteria to be in direct contact with the fluid and environmental air above the fluid simultaneously.

* * * * *